(12) United States Patent
Polivka et al.

(10) Patent No.: US 8,820,363 B2
(45) Date of Patent: Sep. 2, 2014

(54) WEDGE TYPE PLUG AND METHOD OF PLUGGING A LATERAL LINE

(75) Inventors: Richard Carl Polivka, Lemont, IL (US);
Kyle M. Costa, Wentzville, MO (US);
Keith Blaine Oxner, Chesterfield, MO (US); Stephen Bradley Heuiser, Manchester, MO (US); Cory Wayne Husemann, O'Fallon, MO (US);
Clayton Muenchmeyer, Danville, IN (US)

(73) Assignee: INA Acquisition Corp., Wilmington, DE (US)

( * ) Notice: Subject to any disclaimer, the term of this patent is extended or adjusted under 35 U.S.C. 154(b) by 618 days.

(21) Appl. No.: 13/071,260

(22) Filed: Mar. 24, 2011

(65) Prior Publication Data

US 2011/0232793 A1    Sep. 29, 2011

Related U.S. Application Data

(60) Provisional application No. 61/316,832, filed on Mar. 24, 2010.

(51) Int. Cl.
*F16L 45/00*    (2006.01)

(52) U.S. Cl.
USPC ........................................................ 138/92

(58) Field of Classification Search
CPC ....... F16L 55/16; F16L 55/132; F16L 55/179; F16L 55/265; B25B 13/00; B25B 19/00; B25B 13/48; B25B 21/002; B25B 21/004; B23P 19/00
USPC .............. 138/84, 92, 94, 89; 408/24; 451/348
See application file for complete search history.

(56) References Cited

U.S. PATENT DOCUMENTS

| | | | |
|---|---|---|---|
| 1,887,423 A | 11/1932 | Parker | |
| 2,625,955 A * | 1/1953 | Day | ................................ 138/89 |
| 3,173,712 A | 3/1965 | Zahuranec et al. | |
| 3,531,142 A | 9/1970 | Peasley | |
| 4,009,063 A | 2/1977 | Wood | |
| 4,064,211 A | 12/1977 | Wood | |
| 4,114,654 A | 9/1978 | Richardson | |
| 4,140,040 A * | 2/1979 | Modrey | .......................... 411/45 |

(Continued)

FOREIGN PATENT DOCUMENTS

| | | |
|---|---|---|
| DE | 4024926 A1 | 2/1992 |
| DE | 19504139 A1 | 8/1996 |

(Continued)

*Primary Examiner* — Paul R Durand
*Assistant Examiner* — Vishal Pancholi
(74) *Attorney, Agent, or Firm* — Senniger Powers LLP

(57) ABSTRACT

A plug for temporarily plugging a lateral line from lateral opening in a main pipeline. A distal end of the plug is inserted in the lateral line from the main pipeline. The plug includes a fitting tube and a wedge constructed for deforming a deformable portion of the fitting tube outward to plug the lateral opening. Axial movement of the wedge with respect to the fitting tube toward a flow area of the main pipeline causes deformation of the deformable portion. A gripping member may be positioned on an outer surface of the fitting tube. The plug may include a fitting on the fitting tube to facilitate gripping of the plug by a tool. A cutting and brushing assembly may be used to remove the plug from the lateral line. Methods of installing and removing lateral plugs are also disclosed.

18 Claims, 32 Drawing Sheets

(56) References Cited

U.S. PATENT DOCUMENTS

| | | | |
|---|---|---|---|
| 4,197,908 A | 4/1980 | Davis et al. | |
| 4,249,577 A | 2/1981 | Davis | |
| 4,411,458 A * | 10/1983 | Strunk et al. | 285/196 |
| 4,425,943 A | 1/1984 | Martin | |
| 4,434,115 A | 2/1984 | Chick | |
| 4,436,117 A | 3/1984 | Martin | |
| 4,438,784 A * | 3/1984 | Bobichon et al. | 138/92 |
| 4,442,891 A | 4/1984 | Wood | |
| 4,506,705 A | 3/1985 | Thompson | |
| 4,577,388 A | 3/1986 | Wood | |
| 4,620,330 A * | 11/1986 | Izzi, Sr. | 4/288 |
| 4,630,676 A | 12/1986 | Long, Jr. | |
| 4,648,454 A | 3/1987 | Yarnell | |
| 4,701,988 A | 10/1987 | Wood | |
| 4,724,108 A | 2/1988 | Jurgenlohmann et al. | |
| 4,768,560 A | 9/1988 | Logsdon | |
| 4,778,553 A | 10/1988 | Wood | |
| 4,785,512 A | 11/1988 | Sigel | |
| 4,786,345 A | 11/1988 | Wood | |
| 4,819,721 A | 4/1989 | Long, Jr. | |
| 4,867,921 A | 9/1989 | Steketee, Jr. | |
| 4,893,389 A | 1/1990 | Allen et al. | |
| 4,893,841 A | 1/1990 | Bowen | |
| 4,907,911 A | 3/1990 | Rodriguez et al. | |
| 4,923,663 A | 5/1990 | McMillan | |
| 4,951,758 A | 8/1990 | Sonku et al. | |
| 4,955,951 A | 9/1990 | Nemoto et al. | |
| 4,989,314 A | 2/1991 | De Waal | |
| 4,991,006 A | 2/1991 | Wood | |
| 5,018,545 A | 5/1991 | Wells | |
| 5,044,405 A | 9/1991 | Driver et al. | |
| 5,044,824 A | 9/1991 | Long, Jr. et al. | |
| 5,046,903 A | 9/1991 | Nagayoshi et al. | |
| 5,076,311 A | 12/1991 | Marschke | |
| 5,105,882 A | 4/1992 | Ralston et al. | |
| 5,108,533 A | 4/1992 | Long, Jr. et al. | |
| 5,150,056 A | 9/1992 | Wilcock | |
| 5,153,718 A | 10/1992 | Massar | |
| 5,197,540 A | 3/1993 | Yagi et al. | |
| 5,199,145 A | 4/1993 | McMillan et al. | |
| 5,207,031 A | 5/1993 | Gammelgaard | |
| 5,240,290 A | 8/1993 | Kim | |
| 5,253,956 A | 10/1993 | Fisco et al. | |
| 5,255,624 A | 10/1993 | Legare | |
| 5,280,670 A | 1/1994 | Toomey et al. | |
| 5,318,395 A | 6/1994 | Driver | |
| 5,333,649 A | 8/1994 | Shimokawa et al. | |
| 5,393,481 A | 2/1995 | Wood | |
| 5,520,569 A | 5/1996 | Endoh | |
| 5,540,613 A | 7/1996 | Kamiyama et al. | |
| 5,577,864 A | 11/1996 | Wood et al. | |
| 5,609,439 A | 3/1997 | Schreiner et al. | |
| 5,655,283 A * | 8/1997 | Driver et al. | 29/512 |
| 5,660,202 A | 8/1997 | Rush, Jr. et al. | |
| 5,692,543 A | 12/1997 | Wood | |
| 5,737,822 A | 4/1998 | Driver et al. | |
| 5,865,214 A * | 2/1999 | Stearns | 138/89 |
| 5,915,419 A | 6/1999 | Tweedie et al. | |
| 5,916,406 A | 6/1999 | Kamiyama et al. | |
| 5,927,341 A | 7/1999 | Taylor | |
| 5,934,332 A | 8/1999 | Rodriguez et al. | |
| 5,944,058 A | 8/1999 | Kamiyama et al. | |
| 5,960,882 A | 10/1999 | Polivka | |
| 5,971,032 A | 10/1999 | Ward | |
| 6,001,212 A | 12/1999 | Polivka et al. | |
| 6,029,726 A | 2/2000 | Tweedie et al. | |
| 6,056,017 A | 5/2000 | Kamiyama et al. | |
| 6,068,725 A | 5/2000 | Tweedie et al. | |
| 6,082,411 A | 7/2000 | Ward | |
| 6,085,794 A | 7/2000 | Kamiyama et al. | |
| 6,123,109 A | 9/2000 | Kamiyama et al. | |
| 6,146,491 A | 11/2000 | Wood et al. | |
| 6,158,473 A | 12/2000 | Kamiyama et al. | |
| 6,206,049 B1 | 3/2001 | Ward | |
| 6,651,699 B2 | 11/2003 | Kweon | |
| 6,688,337 B2 | 2/2004 | Ward | |
| 6,755,216 B1 | 6/2004 | Mostala | |
| 6,883,547 B1 * | 4/2005 | Jorgensen | 138/89 |
| 7,073,536 B2 | 7/2006 | Blackmore et al. | |
| 7,131,791 B2 | 11/2006 | Whittaker et al. | |
| 7,221,083 B2 | 5/2007 | Oaku et al. | |
| 7,292,156 B2 | 11/2007 | Smith et al. | |
| 7,314,065 B1 | 1/2008 | Adelman et al. | |
| 7,546,847 B2 | 6/2009 | Morrison et al. | |
| 7,631,665 B2 | 12/2009 | Muhlin | |
| 7,707,704 B2 | 5/2010 | Crocker et al. | |
| 2003/0000590 A1 * | 1/2003 | Chen | 138/89 |
| 2004/0078954 A1 | 4/2004 | Crocker et al. | |
| 2005/0241711 A1 | 11/2005 | Sayers et al. | |
| 2007/0277893 A1 * | 12/2007 | Belford | 138/92 |
| 2007/0284876 A1 | 12/2007 | Polivka et al. | |

FOREIGN PATENT DOCUMENTS

| | | |
|---|---|---|
| DE | 202005004781 U1 | 6/2005 |
| EP | 0253630 A1 | 1/1988 |
| EP | 0260220 B1 | 3/1988 |
| EP | 0462527 A1 | 12/1991 |
| EP | 0506181 A1 | 9/1992 |
| EP | 0310679 B1 | 7/1993 |
| EP | 0640727 B1 | 11/2001 |
| GB | 566954 A | 1/1945 |
| GB | 2041147 A | 9/1980 |
| GB | 2172358 A | 9/1986 |
| GB | 2282653 A | 4/1995 |
| JP | 1317745 A | 12/1989 |
| JP | 2275196 A | 11/1990 |
| JP | 5059761 A | 3/1993 |
| JP | 5263980 A | 10/1993 |
| WO | 9410495 A1 | 4/1994 |
| WO | 9945307 A1 | 9/1999 |
| WO | 0207081 A1 | 1/2002 |
| WO | 03078886 A1 | 9/2003 |

* cited by examiner

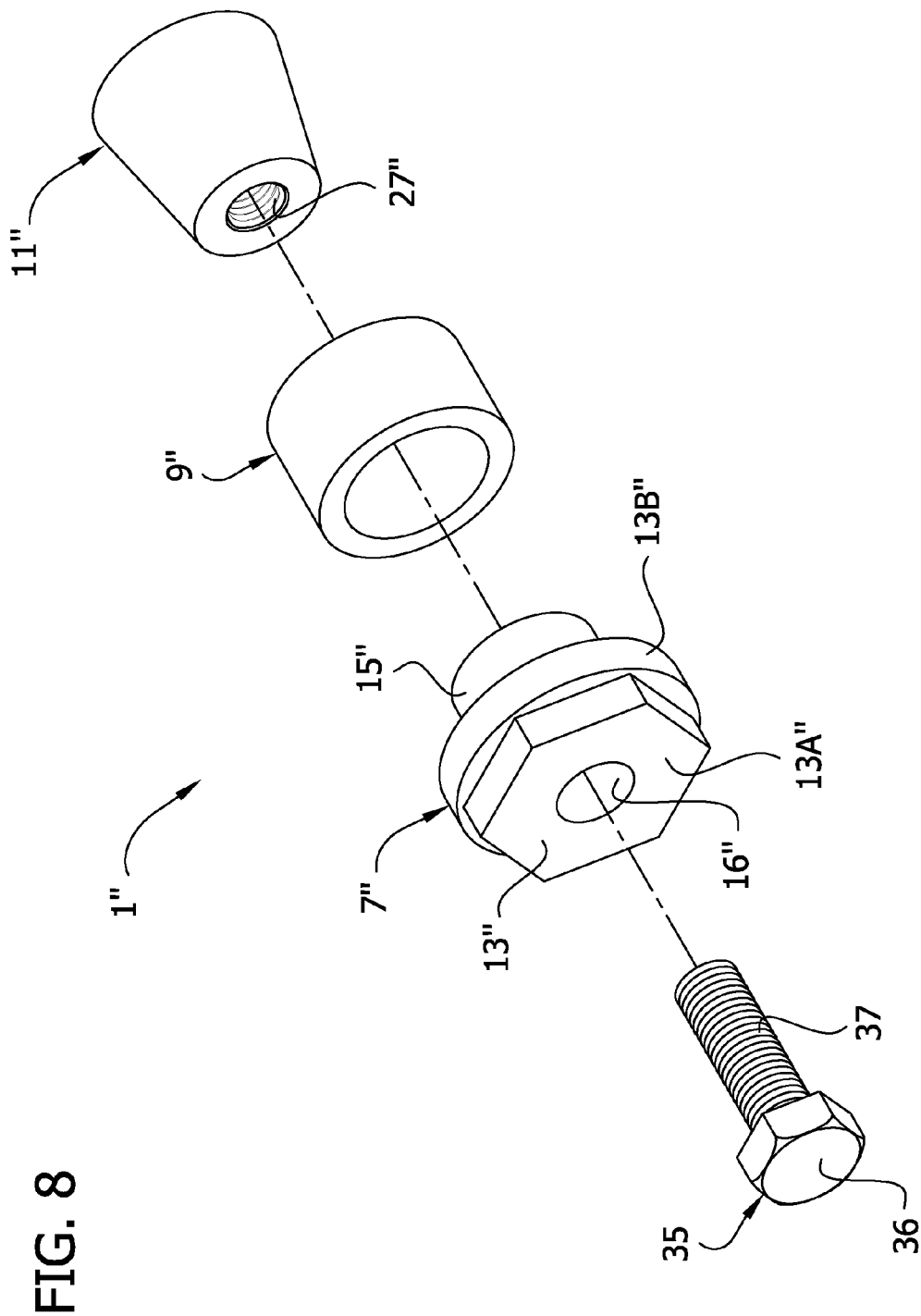

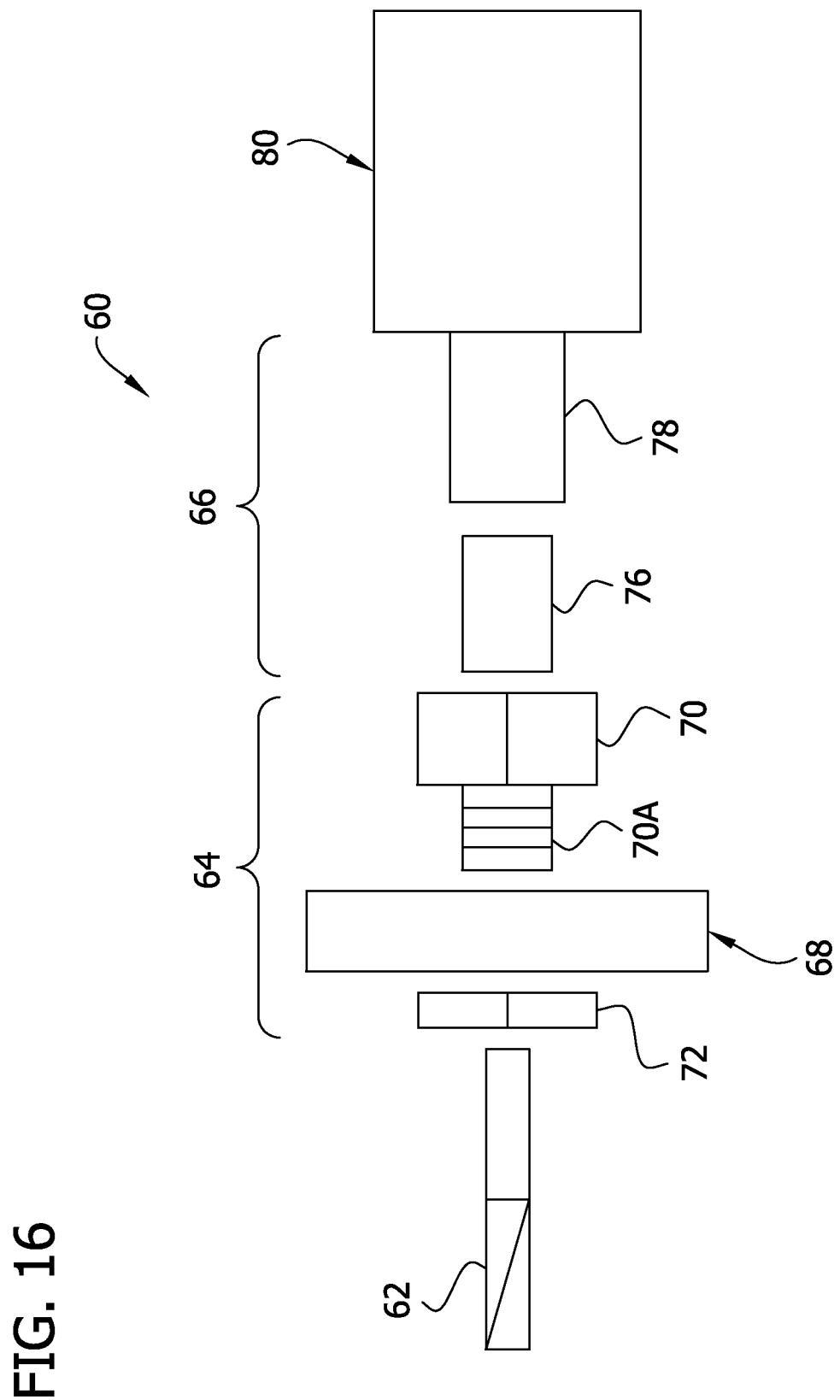

WEDGE TYPE PLUG AND METHOD OF PLUGGING A LATERAL LINE

FIELD OF THE INVENTION

The present disclosure generally relates to pipe rehabilitation. In particular, the present disclosure relates to pipe rehabilitation using a cured in place liner.

BACKGROUND OF THE INVENTION

This invention relates to apparatus and methods for internally lining an existing pipeline with a cured in place liner and internally reinstating a connection in the pipeline. A variety of circumstances exist in which it is desirable to line a pipeline and then reinstate a junction or lateral line from a main, fluid-carrying pipeline. For instance, in the municipal area, it is often necessary to line a water main and then reinstate a lateral line extending from the water main. A similar need exists in other industries, such as in the chemical pipeline industries. It is desirable to provide improved methods and apparatus to rehabilitate a pipeline and reinstate a connection internally to avoid the need to excavate.

SUMMARY OF THE INVENTION

In one aspect, the present invention is directed to a plug for temporarily plugging a lateral line from a lateral opening in a main pipeline. The plug has a distal end which in use is inserted in the lateral line and a proximal end which in use is positioned closer to a flow path in the main pipeline than the distal end. The plug includes a one piece fitting tube sized and shaped for being inserted at least partially in the lateral line. The fitting tube has a deformable portion and a through hole extending through the fitting tube from a proximal end of the fitting tube to a distal end of the fitting tube. The fitting tube has a thread on an inner surface of the through hole. The plug also includes a wedge sized and shaped to be at least partially receivable in the through hole of the fitting tube from the distal end of the fitting tube. The wedge has an external thread corresponding to the thread on the inner surface of the through hole of the fitting tube for threadably engaging the fitting tube. The wedge includes a head constructed for deforming the deformable portion of the fitting tube outward to plug the lateral opening. The head has a proximal portion having a lesser width than a distal portion of the head. In use, the wedge is inserted in and in threaded engagement with the through hole of the fitting tube from the distal end of the fitting tube and rotation of the wedge causes axial movement of the wedge with respect to the fitting tube toward the flow path of the main pipeline and causes the head of the wedge to deform the deformable portion of the fitting tube outward to plug the lateral line.

In another aspect, the present invention is direct to a method of temporarily plugging a lateral line from a lateral opening in a main pipeline. The method includes inserting a plug including a wedge in threaded engagement with a fitting tube in the lateral line from the lateral opening in the main pipeline. The method further includes rotating the wedge such that the threaded engagement of the wedge with the fitting tube causes axial movement of the wedge with respect to the fitting tube to tend to move the wedge toward a flow area of the main pipeline and cause the wedge to wedge a portion of the fitting tube outward to plug the lateral line.

In yet another aspect, the present invention is directed to a plug for temporarily plugging a lateral line from a lateral opening in a main pipeline. The plug has a distal end which in use is inserted in the lateral line and a proximal end which in use is positioned closer to a flow path in the main pipeline than the distal end. The plug includes a one piece fitting tube sized and shaped for being inserted at least partially in the lateral line. The fitting tube has a deformable portion and a through hole extending through the fitting tube from a proximal end of the fitting tube to a distal end of the fitting tube. The plug also includes a wedge sized and shaped to be at least partially receivable in the through hole of the fitting tube from the distal end of the fitting tube. The wedge has a bore extending from a proximal end of the wedge having an internal thread. The wedge includes a head constructed for deforming the deformable portion of the fitting tube outward to plug the lateral opening. The head has a proximal portion having a lesser width than a distal portion of the head and a bolt having a generally cylindrical shaft having an external thread on the shaft corresponding to the internal thread of the wedge for threadably engaging the wedge. The shaft is sized and shaped for being received at least partially in the through hole of the fitting tube from the proximal end of the fitting tube so the bolt is accessible from the main pipeline. In use, the bolt is positioned at least partially in the through hole of the fitting tube from the proximal end of the fitting tube and in threaded engagement with the wedge and rotation of the bolt causes axial movement of the wedge with respect to the fitting tube toward the flow path of the main pipeline and causes the head of the wedge to deform the deformable portion of the fitting tube outward to plug the lateral line.

In yet another aspect, the present invention is directed to a method of temporarily plugging a lateral line from a lateral opening in a main pipeline. The method includes inserting a plug in the lateral line from the lateral opening in the main pipeline. The plug includes a bolt at least partially received in a through-hole of a fitting tube and in threaded engagement with a wedge. The method further includes rotating the bolt such that the threaded engagement of the bolt with the wedge causes axial movement of the wedge with respect to the fitting tube to tend to move the wedge toward a flow area of the main pipeline and cause the wedge to wedge a portion of the fitting tube outward to plug the lateral line.

In still another aspect, the present invention is directed to a cutting and brushing assembly configured for use with a robot for removing a plug plugging a lateral line from a lateral opening in a main pipeline. The plug has an outer diameter. The assembly includes a mount for mounting the cutting and brushing assembly on the robot. A cutting bit connected to the mount has a distal end which in use is advanced into the plug to cut the plug and has a proximal end and a width. A brush has a body connected to the cutting bit for conjoint rotation with the cutting bit. The body is spaced from the distal end of the cutting bit. The brush includes bristles extending outward from the body. The brush has a width greater than the width of the cutting bit. The brush is positioned between the mount and the distal end of the cutting bit.

In a further aspect, the present invention is directed to a ratchet assembly for use on a robot for installing a plug in a lateral line from a lateral opening in a main pipeline for temporarily plugging the lateral line. The ratchet assembly includes a ratchet having a motor for rotating a part of the plug, a battery operatively connected to the motor for energizing the motor, and a trigger adapted for controlling operation of the motor. The trigger has a first position in which the motor is energized and a second position in which the motor is not energized. The ratchet assembly also includes an actuation mechanism connected to the ratchet including a piston and an actuator connected to the piston. The actuator is selectively movable by the piston to engage the trigger and move the trigger to the first position to energize the motor.

BRIEF DESCRIPTION OF THE DRAWINGS

FIG. 8 is an exploded perspective of a plug of yet another embodiment of the present invention;

FIG. 16 is a diagrammatic, exploded elevation of a cutting and brushing assembly for use in drilling out the plug after lining;

Corresponding reference characters indicate corresponding parts throughout the drawings.

DETAILED DESCRIPTION

Figure 1:
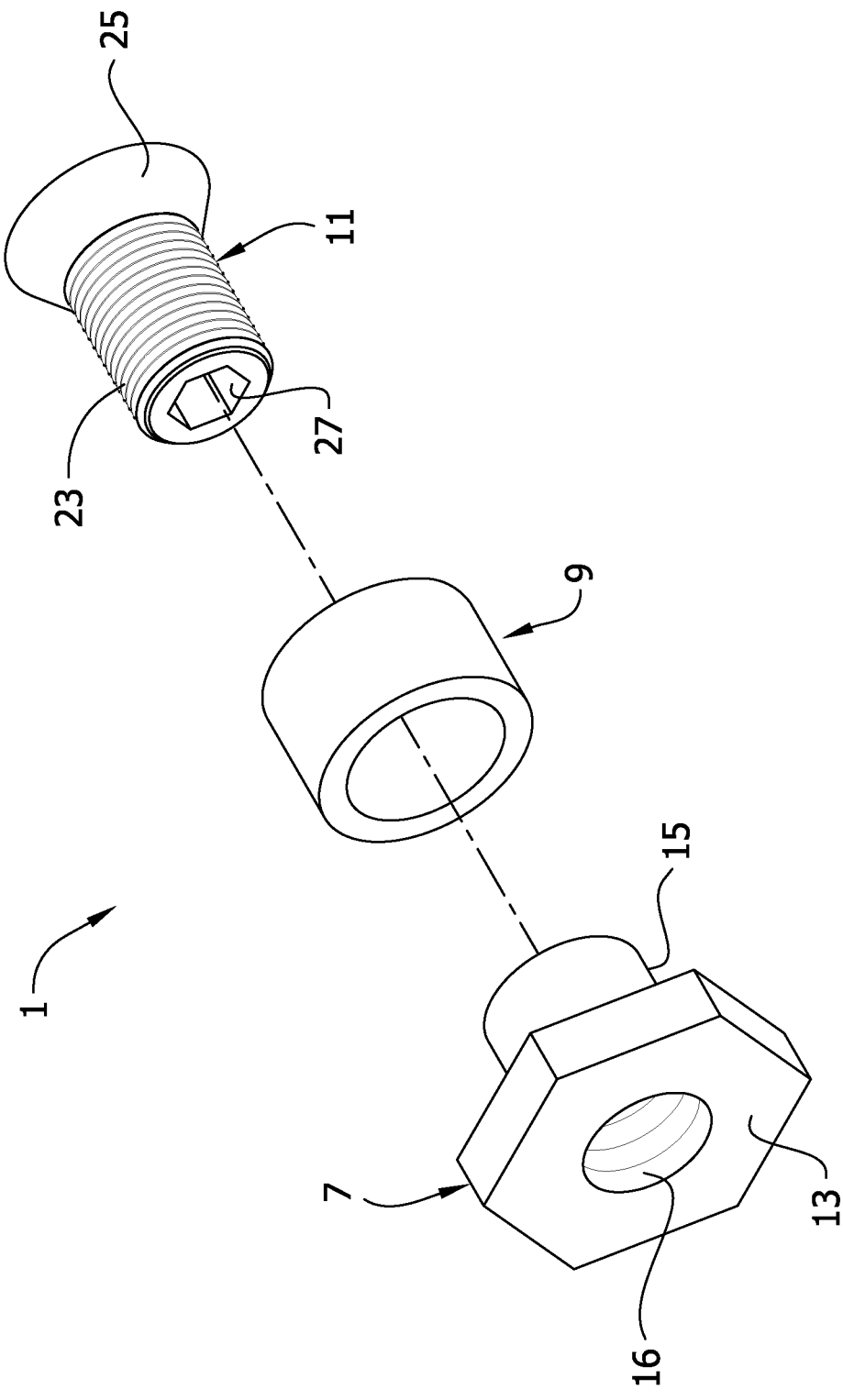
FIG. 1 is an exploded perspective of a plug of one embodiment of the present invention.

In the municipal area, many water mains were constructed years ago and the wall structures are now badly eroded or collapsing. In order to repair damage in these water mains or other such conduits, it has been proposed to install a liner within the water mains to provide a new water-impervious wall to the system. There are a wide variety of different methods available in the art for inserting liners within existing mains. These lining methods include the cured-in-place, fold-and-form and diameter reduction methods, each of which inserts a liner from one end of the conduit to the other. However, the wall of the main is usually not continuous since lateral lines and service connections (e.g., corporation stops) intersect the main at various entry points. The existence of lateral lines and service connections can require some steps both upon installation of the liner and in re-establishing lateral connections.

For various reasons, it is preferable to plug the connections of the main and lateral lines prior to lining the main pipeline. For example, the connections are plugged to prevent migration of resin within the liner before cure of the liner from migrating into the lateral lines, which is particularly undesirable where drinking water is concerned. Excess resin could adversely affect flow through the lateral line after the resin has cured. Plugs also prevent water from entering the main from the lateral lines during the lining process. Water entering the main from the lateral lines could cause the liner to buckle or otherwise deform prior to cure of the resin in the liner. Plugs are also used to provide an indentation in the liner to assist in location of the plugged connections after lining the main so that the connections may be reinstated. As described in further detail below, after the resin in the liner has cured, an opening is formed in the liner and the plug is removed to reinstate free flow between the main and the lateral line.

As used herein, the term "main pipeline" refers broadly to water mains or other conduits such as gas or sewage pipelines. The term "lateral line" is used broadly herein to refer to lines and connections (e.g., service connections) which branch from the main pipeline. A lateral line may have a direct connection to a main pipeline. Alternatively, a lateral line may be connected to a main pipeline using connection structure such as a corporation stop or saddle connection, in which case the "lateral line" includes the connection structure.

The plugs described herein are useful for several types of lateral lines including corporation stops and saddle connections. A corporation stop provides a simple circular opening to be sealed. However for a saddle type connection, a separate pipe is attached over the outside of the main. The lateral opening opens into a much larger diameter pipe and there is nothing inserted into the lateral opening. This is in contrast to a corporation stop which is threaded into the lateral opening. As a result the lateral opening is not a circle, but rather has a somewhat elliptical shape as a result of the curvature of the wall of the water main. The plug of the present invention has been found to work well to seal and tightly retain themselves in these non-round lateral openings because of the ability of the plug to expand.

Plugs of the present invention may be installed using a robot (not shown) configured and sized for navigating within a main pipeline. An example of an assembly including a robot is disclosed in detail in co-assigned U.S. patent application Ser. No. 11/796,379 (the '379 Application), which is hereby incorporated by reference in its entirety. The robot disclosed in the '379 Application may be suitably modified for installing plugs according to the present invention.

Figure 3:
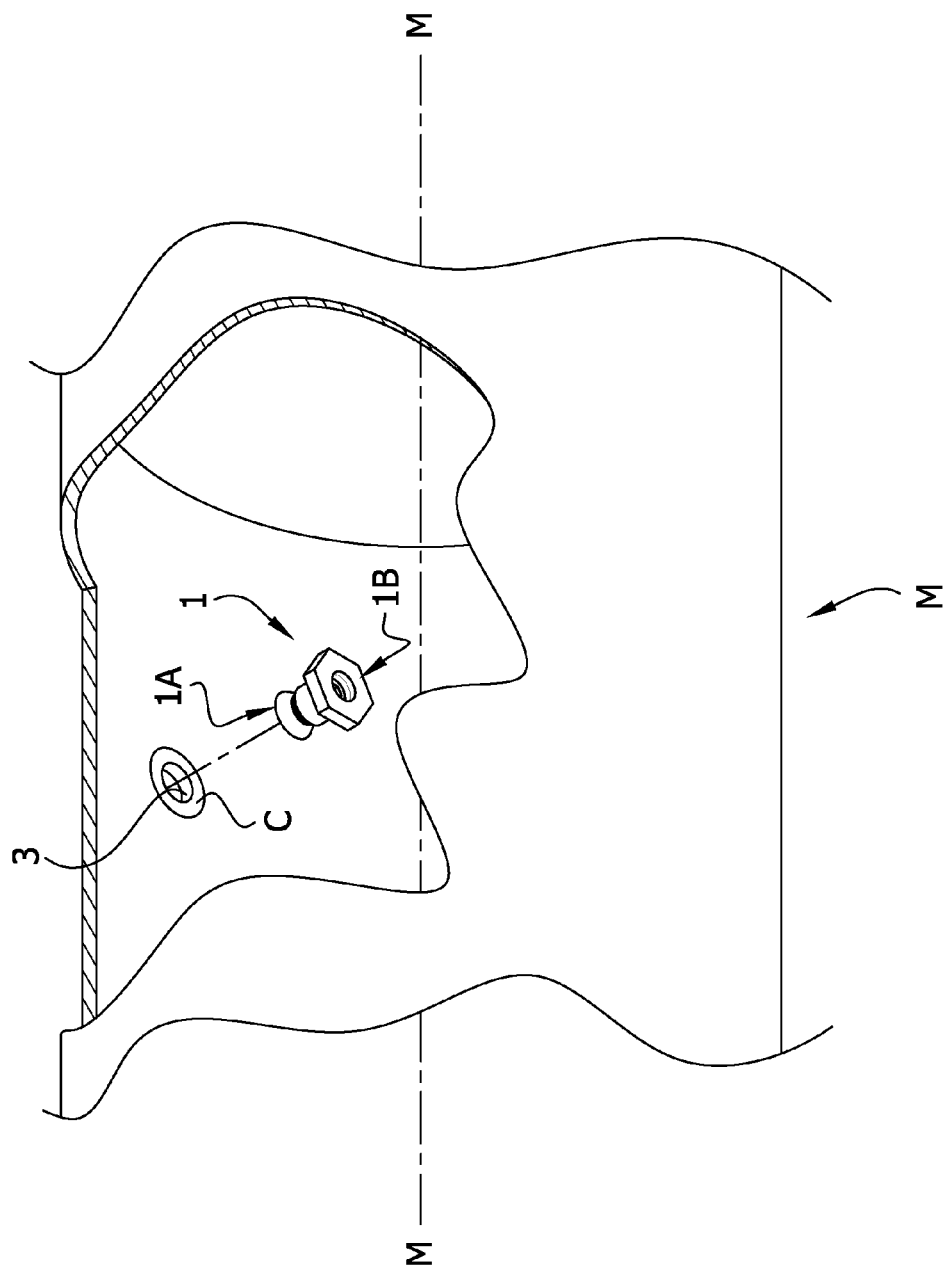
FIG. 3 is a fragmentary perspective of a water main with a part of the wall broken away to show the plug just prior to insertion into a lateral opening.
Figure 4:
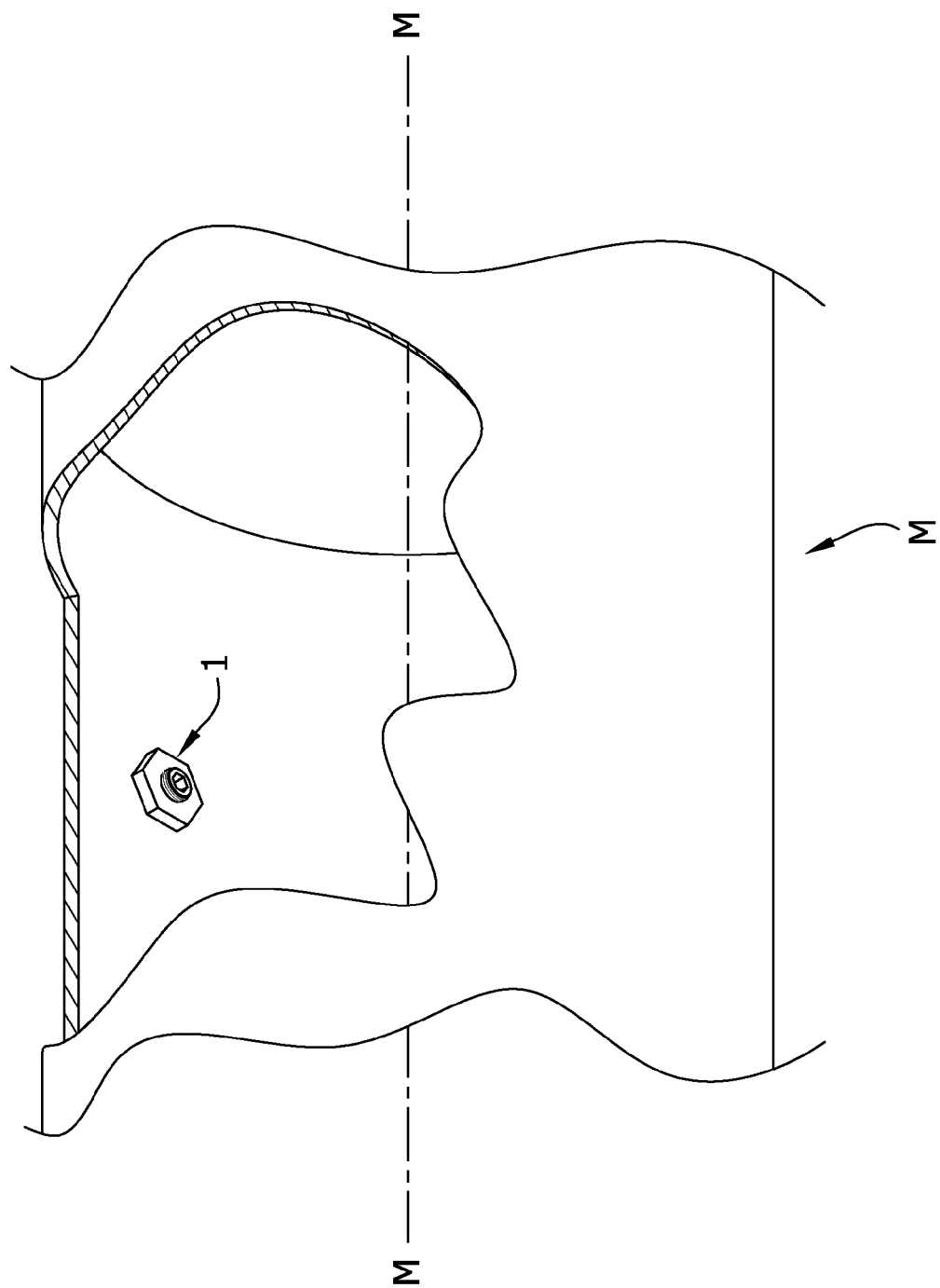
FIG. 4 is the perspective of FIG. 3 but with the plug inserted into the lateral opening.
Figure 5:
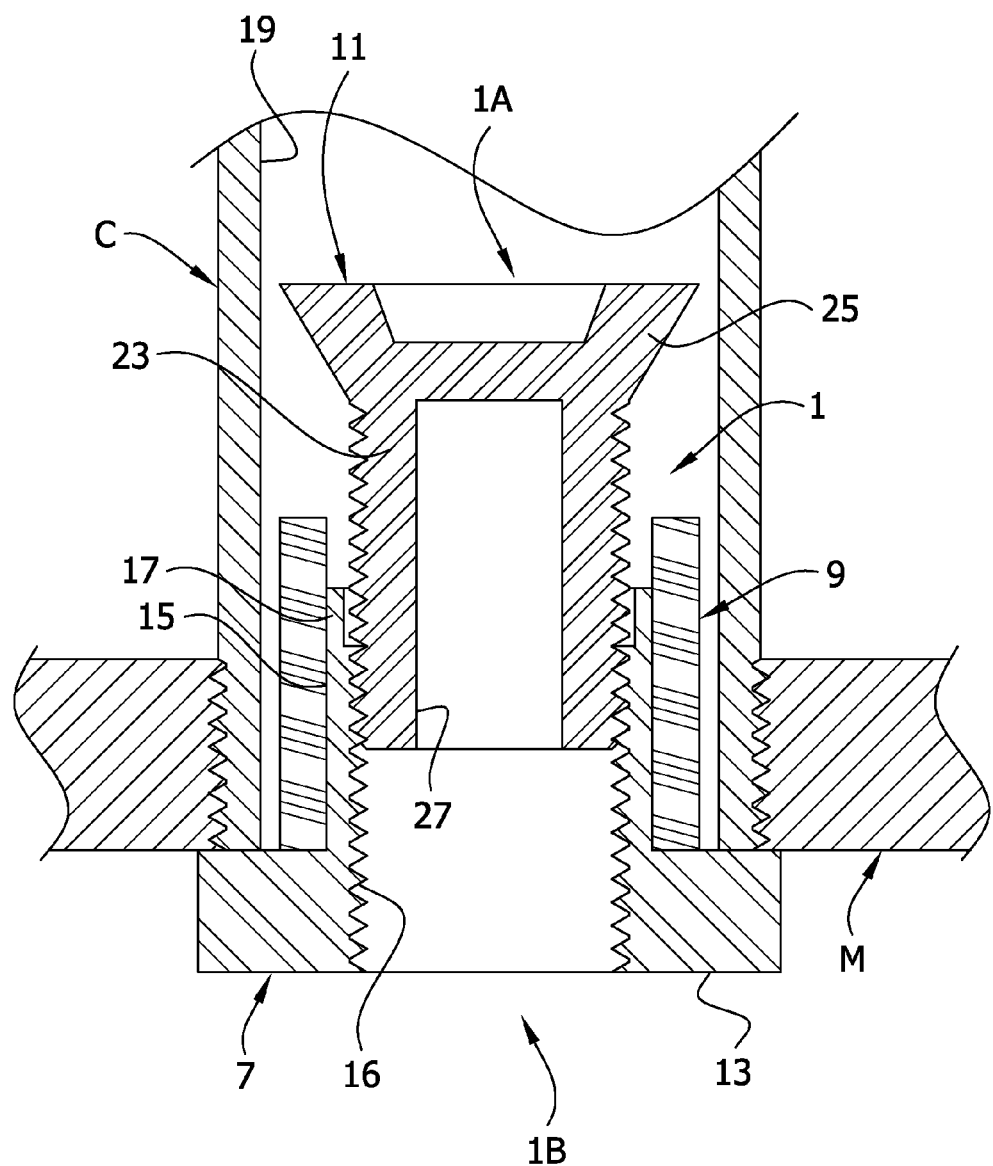
FIG. 5 is an enlarged section of the water main and corporation stop with the plug inserted therein prior to tightening of the wedge.
Figure 6:
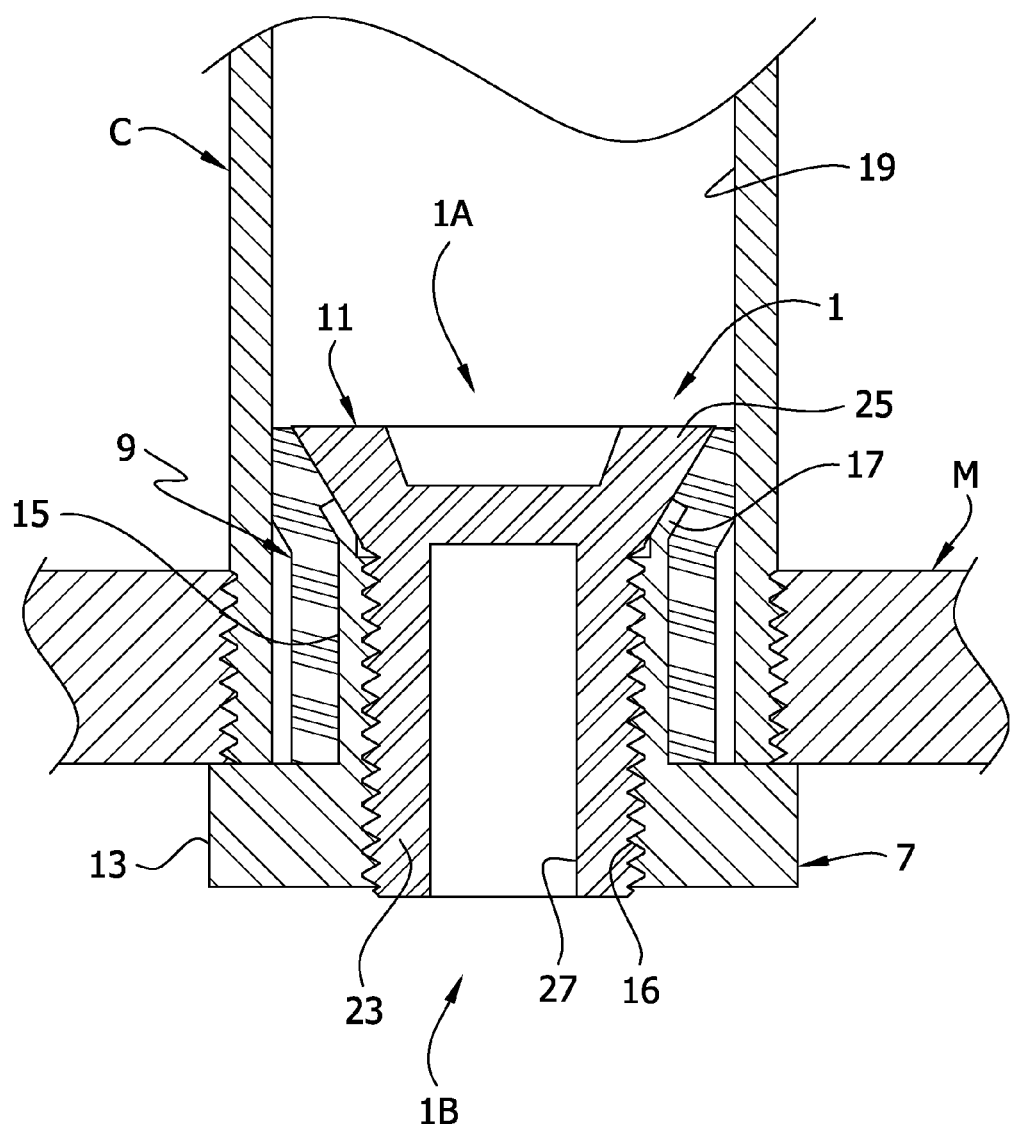
FIG. 6 is the section of FIG. 5 with the wedge tightened.

Referring now to the drawings and in particular to FIGS. 1-6, a plug is designated generally at 1. The plug as constructed according to the principles of the present invention is received in an opening 3 (see FIG. 3) of a water main M which is in fluid communication with a lateral line, such as a lateral line leading to a residence or other location (not shown). Although the line could be for transporting any fluid (liquid or gas), in the illustrated embodiment it is for transporting drinking water from the water main M to the residence. The water main M has a flow path generally indicated by the line M-M shown in FIGS. 3 and 4. As illustrated, the part of the lateral line connected to the water main M is a corporation stop C, although other types of connections including saddle connections are contemplated. A fragmentary portion of the corporation stop C is illustrated in FIGS. 5 and 6. The plug 1 is used to block the opening 3 and prevent fluid communication between the water main M and the lateral line. As will be described more fully hereinafter, the plug 1 may be beneficially used in connection with rehabilitation of a water main M by lining the water main. The plug 1 temporarily closes off the lateral line from the water main M to isolate the lateral line from the lining process used for the water main M. The plug 1 has a distal end 1A which in use is inserted in the lateral line and a proximal end 1B which is positioned closer to the flow path of the main pipeline M-M than the distal end. Consistent with this convention, when describing parts of the plug 1 herein, the terms "distal" and "proximal" refer to the position of the parts of the plug with respect to the flow path of the main pipeline M-M when the plug is in the lateral line.

Referring again to FIG. 1, the plug 1 comprises a fitting tube 7, a conformable gripping member 9, and a wedge 11 (all reference numerals designating the subjects generally). The fitting tube 7 includes a head 13. A distal side of the head 13 defines a flange that engages an inner wall of the water main M adjacent the lateral opening 3 to locate the plug with respect to the water main and prevent the plug from being pushed fully into the lateral opening. The head 13 has a regular geometric peripheral shape (e.g., polygonal) that facilitates gripping by a tool (e.g., a socket) to hold the fitting tube 7 from rotation during installation. In the illustrated embodiment, the head 13 is hexagonal in shape. However, other shapes may be used without departing from the scope of the present invention.

Figure 2:
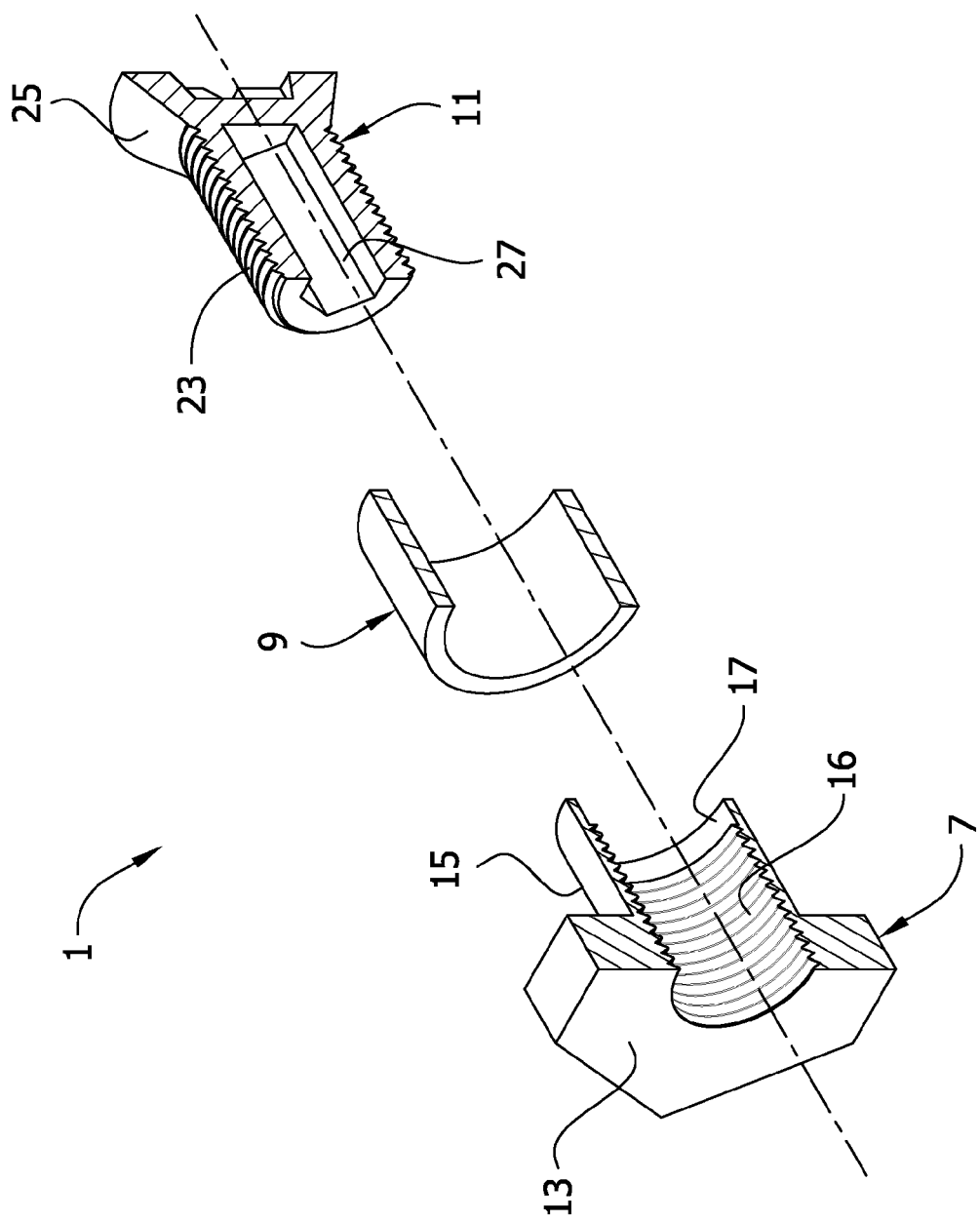
FIG. 2 is the perspective of FIG. 1 but shown in section.

The fitting tube 7 further includes a tubular insert portion 15. A proximal end of the tubular insert portion 15 is connected to the distal side of the head 13. The tubular insert portion 15 is receivable inside the lateral opening 3 and more specifically in the illustrated embodiment inside an entry passage of the corporation stop C connecting the lateral line to the water main M. A central through hole 16 extending through the fitting tube 7 is internally threaded except at a deformable end portion 17 at a distal end of the fitting tube opposite the hex head 13 (FIG. 2). The deformable end portion 17 has a thin wall thickness that facilitates its deformation. The wall thickness is selected according to the particular material, the size of the lateral opening and the desired deformation. In one instance where the material is low density polyethylene (LDPE), the wall thickness of the end portion 17 is preferably less than about 0.09 inches (0.23 cm), more preferably less than about 0.05 inches (0.13 cm) and most preferably about 0.03 inches (0.08 cm). However, it is contemplated that the wall thickness may be well less than 0.03 inches (0.08 cm) (e.g., 0.015 inches (0.038 cm) or less). It is to be understood that the fitting tube 7 may be made out of other materials and the wall thickness of the end portion 17 may be other than described without departing from the scope of the present invention. The remaining parts of the insert portion 15 preferably have a greater wall thickness that is not substantially deformed in use.

The conformable gripping member 9 is receivable around an outer surface (e.g., outer circumference) of the tubular insert portion 15, desirably including the deformable end portion 17. In the illustrated embodiment, when the gripping member 9 is installed on the tubular insert portion 15, the gripping member 9 is carried substantially entirely on the fitting tube 7. In other words, the gripping member 9 has an inner surface and all or most of the inner surface engages the fitting tube 7 when the gripping member is received on the fitting tube. The gripping member 9 may have a length about the same as or slightly longer than the insert portion 15 so when the gripping member is installed on the insert portion all or most of the inner surface of the gripping member engages an outer surface of the insert portion. In the illustrated embodiment, the gripping member 9 has a length slightly longer than the insert portion 15. The internal diameter of the gripping member 9 is preferably the same or smaller than the outside diameter of the insert portion 15 so as to create an interference fit of the gripping member on the fitting tube 7. The conformable gripping member 9 is made of a relatively soft, conformable material. In the illustrated embodiment the gripping member 9 is a short piece of medical tubing having openings at both ends and being made of a suitable material such as a medical grade latex having a durometer of about 30-35 Shore A and a tensile strength of about 4000 psi. The precise material or durometer of the gripping member 9 may be other than described, but desirably the material is able to sealingly conform to rough and uneven surfaces such as may be found on a wall 19 of the entry passage of the corporation stop C to provide both sealing and large surface area engagement. As will be described, the gripping member 9 will be used to engage a substantial surface area of the wall 19 of the entry passage inside the lateral opening 3 for sealing, but also tightly gripping the corporation stop C to strongly resist dislodgement of the plug 1 under pressure. Gripping members having other configurations may be used without departing from the scope of the present invention.

The wedge 11 comprises a generally cylindrical threaded shaft 23 configured for threaded engagement with the through hole of the fitting tube 16 from the distal end of the fitting tube 7 (FIG. 1). The wedge 11 has a head 25 used for wedging the plug 1 into sealing and gripping engagement with the wall 19 of the entry passage of the corporation stop C. The head 25 has a proximal portion (e.g., at its proximal end) which has a lesser width than a distal portion of the head (e.g., at its distal end) for wedging the plug 1 into sealing and gripping engagement with the wall 19. In the illustrated embodiment, the head 25 has a frustoconical shape flaring outward from the proximal end to the distal end of the head and is free from an external thread. The head 25 may flare outward, for example, at an angle of about 45 degrees. The threaded shaft 23 has a blind bore 27 in its proximal end opposite the head 25. The wedge 11 can be made of any suitable material, such as Delrin® polyoxymethylene available from DuPont de Nemours and Company of Wilmington, Del. It will be understood that other suitable materials may be used. It is desirable that the wedge 11 be formed at least in part of the material that is harder than the material of the fitting tube 7 and the gripping member 9. The bore 27 is sized and shaped to receive a tool for rotating the wedge by engaging the bore with the tool. In the illustrated embodiment, the bore 27 has a regular geometric shape, and more specifically a hexagonal shape to receive a tool having a corresponding regular geometric shape such as an Allen wrench for rotating the wedge 11, as will be described hereinafter. The bore 27 may have other shapes or cross sections without departing from the scope of the present invention. The illustrated bore 27 is free from an internal thread.

As assembled, the tubular gripping member 9 is pushed over the outer surface of the insert portion 15 of the fitting tube 7. The wedge 11 is screwed into the open distal end of the insert portion 15 of the fitting tube 7 but is not tightened down. The bore 27 of the wedge 11 is accessible from the main pipeline M (from the proximal end of the plug 1B) through the through hole 16 in the fitting tube 7. As illustrated by the progression of FIGS. 3 and 4, the distal end of the assembled plug 1A can be inserted through the lateral opening 3 into the corporation stop entry passage. In the entry passage, the plug 1 may appear as shown in FIG. 5. The clearance of the plug 1 with the wall 19 of the entry passage is greatly exaggerated in the drawings. In fact the plug 1 may engage the wall of the entry passage and could temporarily hold the plug from falling out of the lateral opening 3. A robot could then continue to hold the head 13 of the fitting tube 7 to keep it from rotating and rotate the wedge 11 through its engagement with the bore 27 of the wedge 11 with a tool from the proximal end of the plug 1B. The threaded engagement of the threaded shaft 23 of the wedge 11 with the fitting tube 7 draws the wedge into the fitting tube. In other words, rotation of the wedge 11 causes axial movement of the wedge with respect to the fitting tube 7 toward the flow path of the main pipeline M-M. As shown in FIG. 6, the head 25 of the wedge 11 engages and wedges out the end portion 17 of the fitting tube 7 and the gripping member 9 into engagement with the wall 19 of the entry passage of the corporation stop C. A relatively small application of torque (e.g., 25 ft-lbs (34 N-m) or less) produces a fit between the plug 1 and the corporation stop C that can withstand a force of 100 lbs (445 N) to 150 lbs (667 N) or more from the water in the lateral line. The plug 1 will not leak and will protect a liner in the main pipeline (not shown) from being collapsed under the pressure of the water from the lateral line.

The plug 1 may be sized for plugging lateral lines of various internal diameters. In one example, the plug 1 is constructed for plugging a ¾ inch (1.9 cm) internal diameter lateral line and has the following dimensions, which are given by way of example and not limitation. The fitting tube 7 has an overall length of about 0.66 inches (1.68 cm). The tubular insert portion 15 has a length of about 0.45 inches (1.14 cm), an outside diameter of about 0.56 inches (1.42 cm), and an inside diameter of about 0.5 inches (1.27 cm). The deformable end portion 17 has a length of about 0.11 inches (0.28 cm). The head 13 is a hexagonal head having a width of about 1 inch (2.54 cm) and a length of about 0.21 inches (0.53 cm). The wedge 11 is about 0.8 inches (2.03 cm) long. The threaded shaft 23 has a length of about 0.61 inches (1.55 cm) and a width of about 0.48 inches (2.90 cm), and the head 25 has a length of about 0.2 inches (0.51 cm) and a maximum width of about 0.72 inches (1.83 cm). The corresponding threads on the wedge 11 and fitting tube 7 are formed at about 20 threads per inch (per 2.54 cm). The gripping member 9 has a length of about 0.45 to 0.5 inches (1.14 to 1.27 cm), and inside and outside diameters of about 0.5 inches (1.27 cm) and 0.75 inches (1.91). The fitting tube 7, wedge 11, and gripping member 9 may have different sizes without departing from the scope of the present invention. For example, if the plug 1 is constructed for plugging a larger diameter lateral line (e.g., 1 or 2 inches (2.54 or 5.08 cm) vs. ¾ inches (1.91 cm)), critical dimensions of the plug parts may be increased proportionally.

Figure 7A:
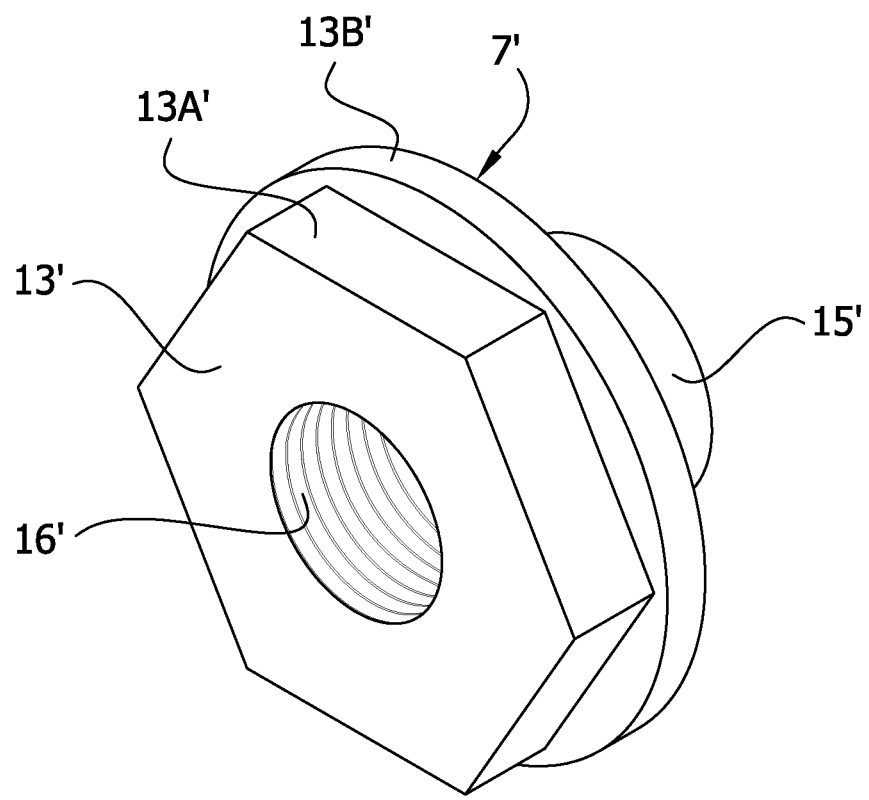
FIG. 7A is a perspective of a fitting tube of a plug of another embodiment.
Figure 7B:
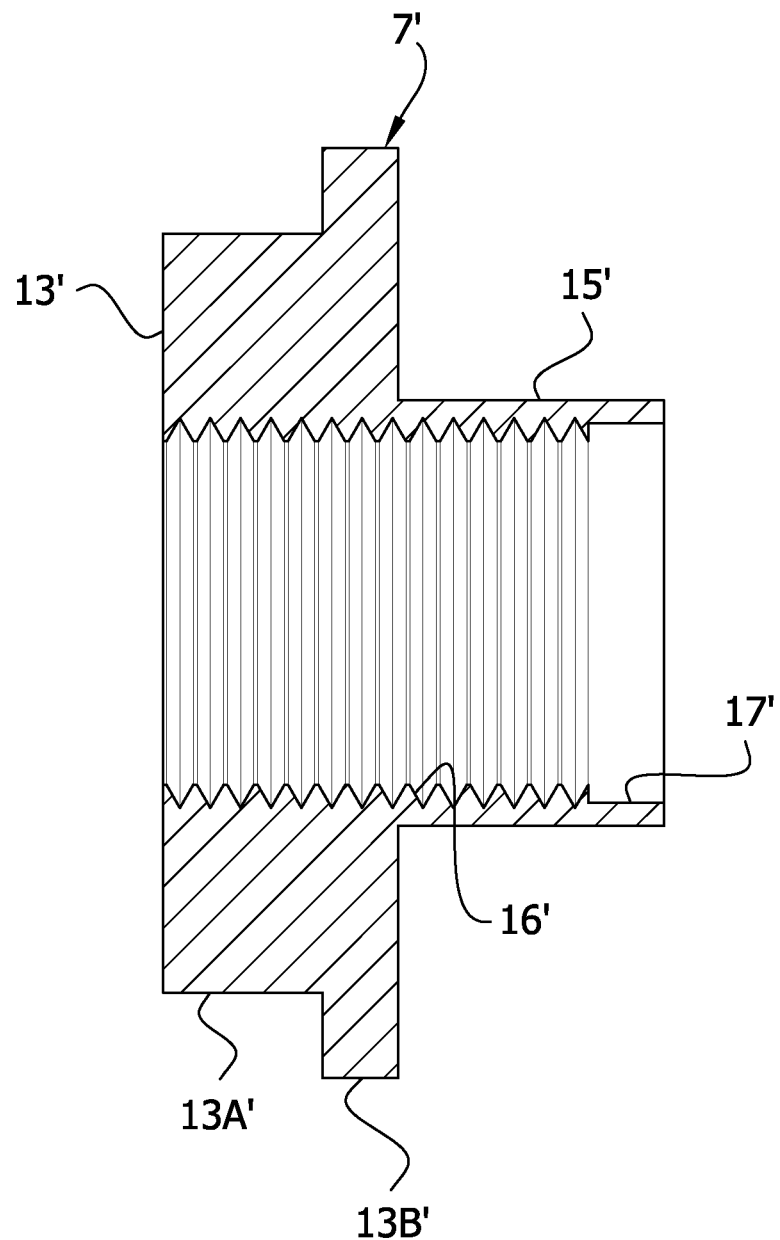
FIG. 7B is a section of the fitting tube of FIG. 7A.
Figure 7C:
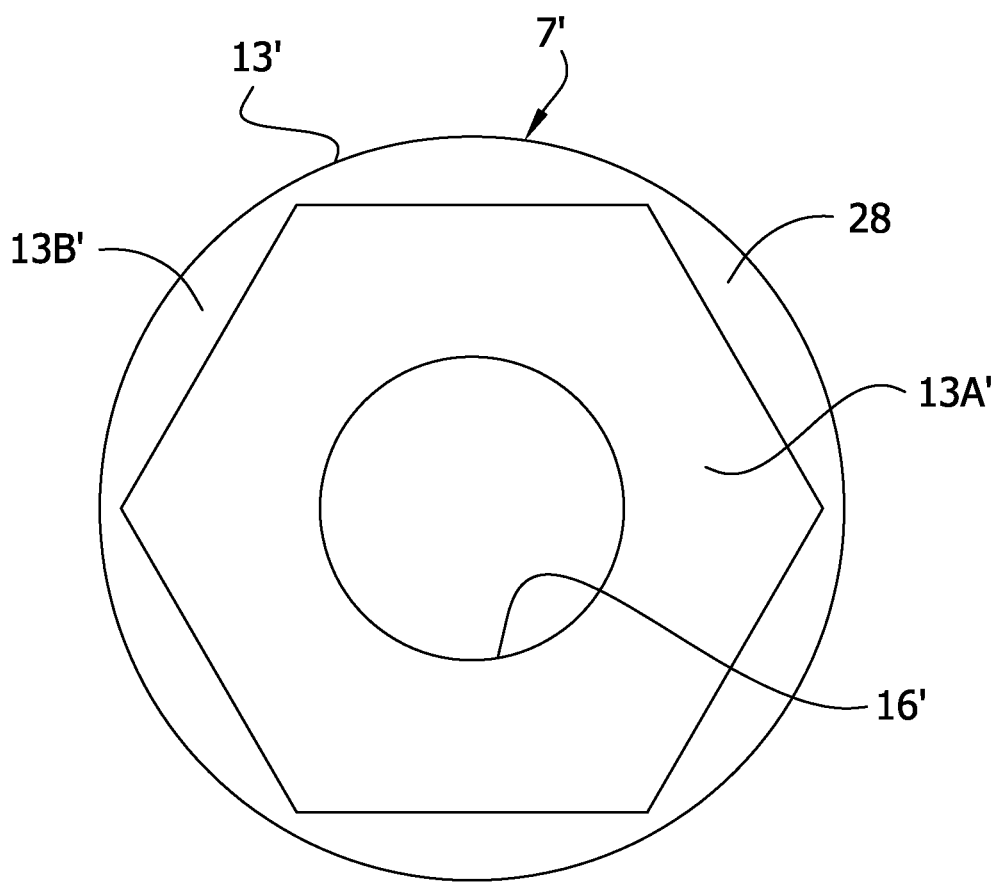
FIG. 7C is an end view of the fitting tube of FIG. 7A.
Figure 9:
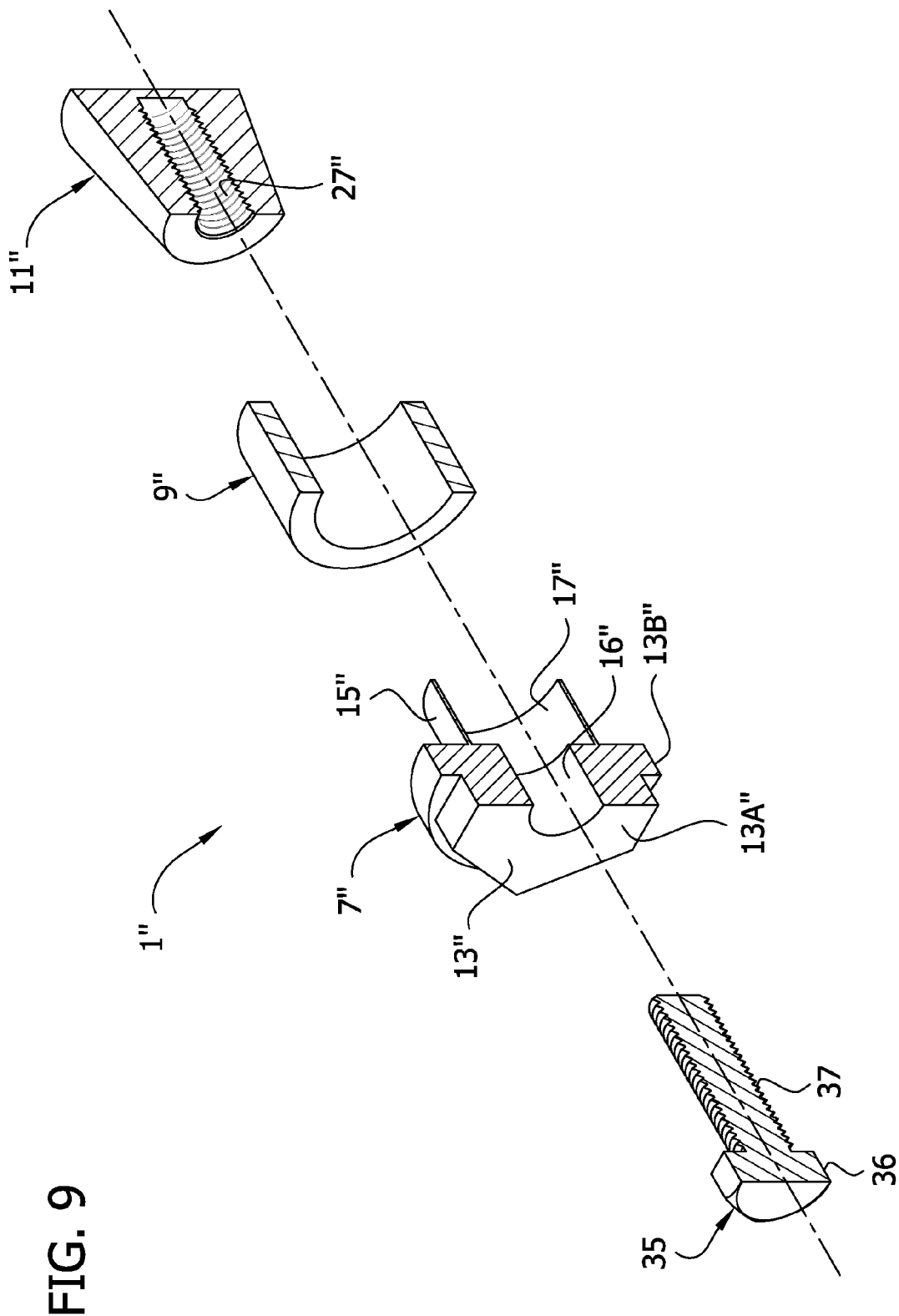
FIG. 9 is the perspective of FIG. 8 but shown in section.

Referring now to FIG. 7A, a fitting tube 7' of a second embodiment is shown. The fitting tube of this embodiment is similar to the fitting tube 7 described above but the head 13' includes a grip portion 13A' and a lip 13B'. The lip is positioned between the grip portion 13A' and the tubular insert portion 15' for engaging the wall 19 of the water main M adjacent to the lateral opening 3 to hold the fitting tube 7' from being pushed entirely into the opening. In the illustrated embodiment, the lip 13B' has a generally circular shape section. The lip 13B' extends radially outward beyond the outer edge of the grip portion 13A' (i.e., the lip is wider than the grip portion) to overlap the edge of the lateral opening. The fitting tube 7' may otherwise be substantially similar or identical to the fitting tube 7 described above and combined with a suitable wedge and gripping member to form a plug like the plug 1 described above.

In one example, the fitting tube 7' is constructed for plugging a 1 inch (2.54 cm) internal diameter lateral line and has the following dimensions, which are given by way of example and not limitation. The fitting tube 7' has an overall length of about 0.76 inches (1.93 cm). The tubular insert portion 15' has a length of about 0.45 inches (1.14 cm), an outside diameter of about 0.73 inches (1.85 cm), and an inside diameter of about 0.69 inches (1.75 cm). The threads in the through bore 16' are formed at about 18 threads per inch (per 2.54 cm). The deformable end portion 17' has a length of about 0.21 inches (0.53 cm). The lip 13B' has a diameter of about 1.28 inches (3.25 cm) and a length of about 0.1 inches (0.25 cm). The grip portion 13A' is hexagonal and has a width of about one inch (2.54 cm) and a length of about 0.21 inches (0.53 cm). It is noted the grip portion 13A' on this example fitting tube 7' has the same width as the grip portion of the head 13 on the example fitting tube 7 described above. The grip portions having the same widths increases convenience because it permits use of the same sized tool (e.g., a 1 inch (2.54 cm) socket) for gripping the heads of the fitting tubes during installation of plugs for plugging different internal diameter lateral lines. A suitably sized wedge and conformable gripping member (not shown) may be used with the fitting tube 7' to form a plug like the plug 1. The dimensions of the fitting tube 7' may be different than described without departing from the scope of the present invention.

FIGS. 8-13 show yet another embodiment of a plug, designated generally at 1". In summary, in this embodiment, the plug 1" includes four rather than three pieces. The fitting tube 7" has a smooth rather than threaded central through hole 16". The wedge 11" comprises a frustoconically shaped outward flaring head but has no threaded shaft. The wedge 11" has a threaded blind bore 27" instead of a bore having no thread. The additional part is a threaded bolt 35 having a head 36 and a generally cylindrical threaded shaft 37. In use, the bolt 35 extends through the central through hole 16" and is threadably engaged with the threaded bore 27" of the wedge 11". The robot holds the head 13" of the fitting tube 7" from rotation (as before), and grips and rotates the head of the bolt 36 to rotate the bolt 35 to draw the wedge 11" into the insert portion 15" of the fitting tube, producing the same gripping and sealing result as before.

Figure 11:
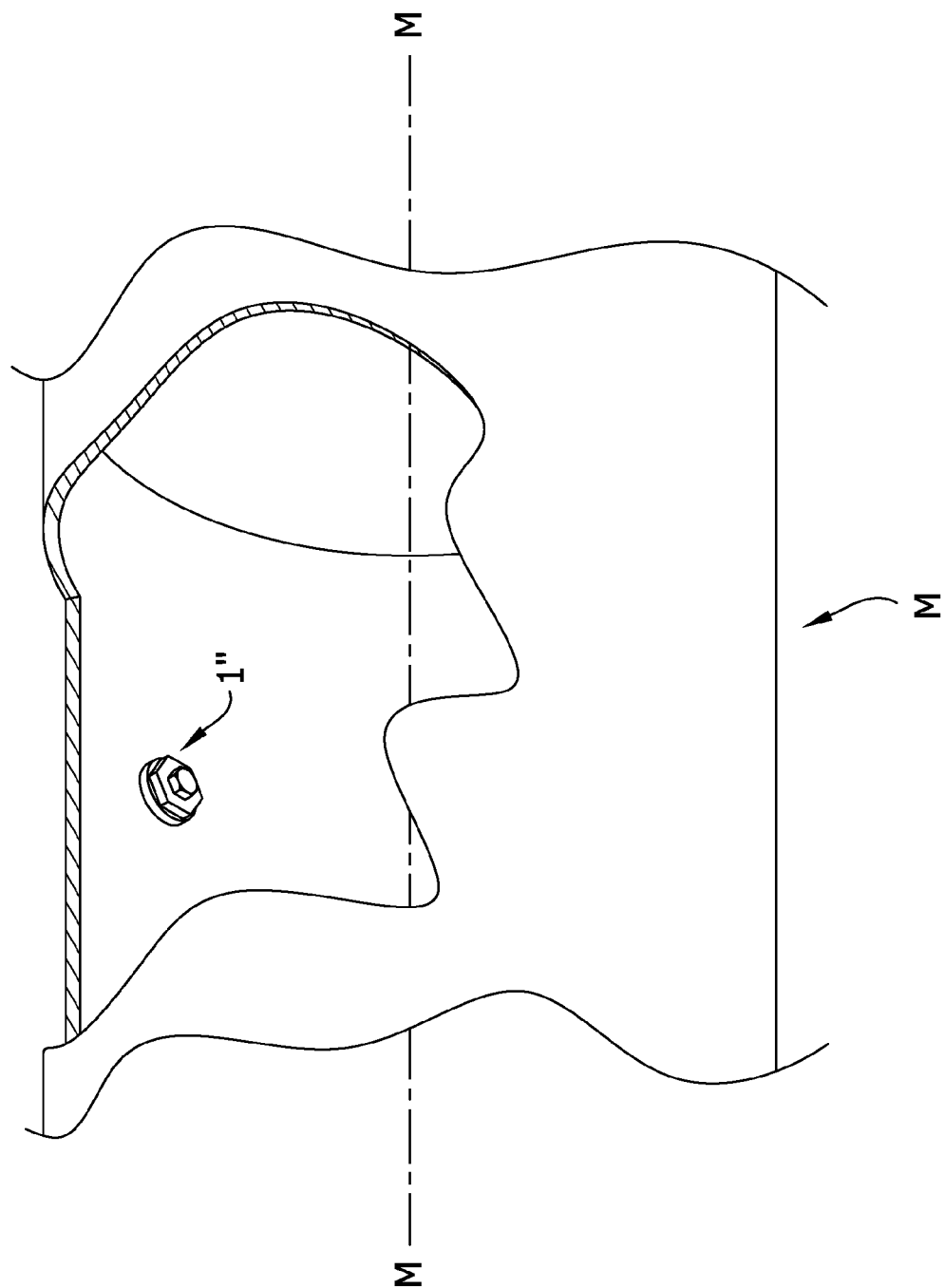
FIG. 11 is a the perspective of FIG. 10 but with the plug inserted into the lateral opening.
Figure 12:
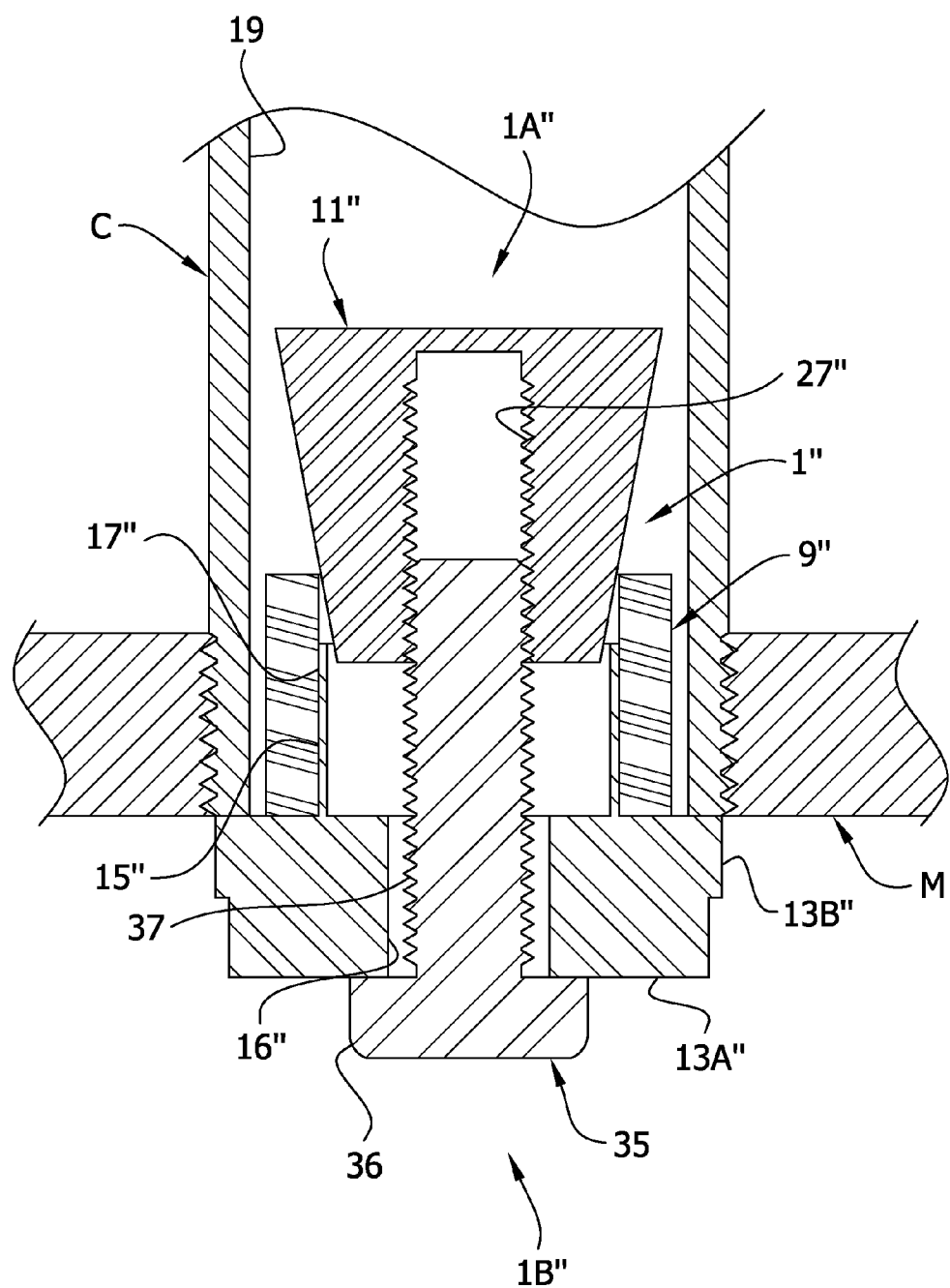
FIG. 12 is an enlarged section of the water main and corporation stop with the plug inserted therein prior to tightening of the wedge.
Figure 13:
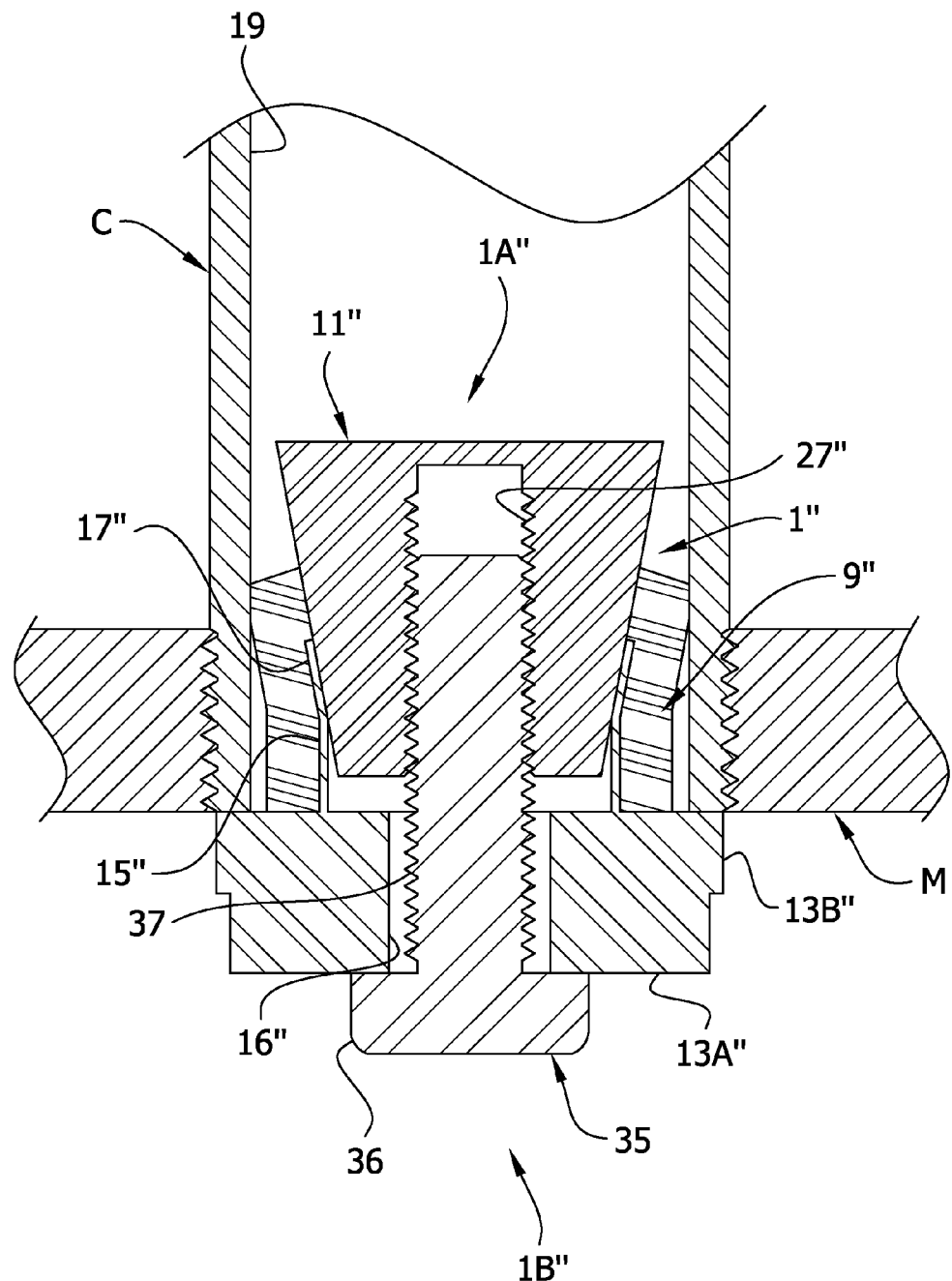
FIG. 13 is the section of FIG. 12 with the wedge tightened.

The plug 1" will now be described in further detail. The plug 1" as constructed according to the principles of the present invention is received in an opening 3 (see FIG. 10) of a water main M which is in fluid communication with a lateral line, such as a lateral line leading to a residence or other location (not shown). Although the line could be for transporting any fluid (liquid or gas), in the illustrated embodiment it is for transporting drinking water from the water main M to the residence. The water main has a flow path generally indicated by the line M-M shown in FIGS. 10 and 11. As illustrated, the part of the lateral line connected to the water main M is a corporation stop C, although other types of connections including saddle connections are contemplated. A fragmentary portion of the corporation stop C is illustrated in FIGS. 12 and 13. The plug 1" is used to block the opening 3 and prevent fluid communication between the water main M and the lateral line. As will be described more fully hereinafter, the plug 1" may be beneficially used in connection with rehabilitation of a water main M by lining the water main. The plug 1" temporarily closes off the lateral line from the water main M to isolate the lateral line from the lining process used for the water main M. The plug 1" has a distal end 1A" which in use is inserted in the lateral line and a proximal end 1B" which is positioned closer to the flow path of the main pipeline M-M than the distal end. Consistent with this convention, when describing parts of the plug 1" herein, the terms "distal" and "proximal" refer to the position of the parts of the plug with respect to the flow path of the main pipeline M-M when the plug is in the lateral line.

Referring again to FIG. 8, the plug 1" comprises a fitting tube 7", a conformable gripping member 9", a wedge 11", and a bolt 35 (all reference numerals designating the subjects generally). The fitting tube 7" has a head 13" including a grip portion 13A" and a lip 13B". A distal side of the lip 13B" defines a flange that engages an inner wall of the water main M adjacent the lateral opening 3 to locate the plug 1" with respect to the water main and prevent the plug from being pushed fully into the lateral opening. The grip portion 13A" has a regular geometric shape to facilitate gripping by a tool (e.g., a socket) to hold the fitting tube 7" from rotation during installation. In the illustrated embodiment, the grip portion 13A" is hexagonal in shape. However, other shapes may be used without departing from the scope of the present invention.

The fitting tube 7" further includes a tubular insert portion 15". A proximal end of the tubular insert portion 15" is connected to the distal side of the head 13". The tubular insert portion 15" is receivable inside the lateral opening 3 and more specifically inside an entry passage of the corporation stop C connecting the lateral line to the water main M. A central through hole 16" extending through the fitting tube 7" is substantially smooth. The through hole 16" has a first diameter in the head 13" and a second larger diameter in the tubular insert portion 15". The first diameter is sized to accommodate the diameter of the threaded shaft of the bolt 37 and may align it with the threaded bore of the wedge 27" when the wedge 11" is positioned at the distal end of the fitting tube. The insert portion 15" including a deformable end portion 17" has a thin wall thickness that facilitates deformation. The wall thickness is selected according to the particular material, the size of the lateral opening and the desired deformation. In one instance where the material is low density polyethylene (LDPE), the wall thickness of the end portion 17" is preferably less than about 0.09 inches (0.23 cm), more preferably less than about 0.05 inches (0.13 cm) and most preferably about 0.03 inches (0.08 cm). However, it is contemplated that the wall thickness may be well less than 0.03 inches (0.08 cm) (e.g., 0.015 inches (0.038 cm) or less). It is to be understood that the fitting tube 7" may be made out of other materials and the wall thickness of the insert portion 15" may be other than described without departing from the scope of the present invention. The insert portion 15" may be different without departing from the scope of the present invention. For example, a main portion of the insert portion 15" may have a wall thickness greater than the wall thickness at the deformable end portion 17" and may not be substantially deformed in use (as described above with respect to insert portion 15).

The conformable gripping member 9" is receivable around an outer surface (e.g., outer circumference) of the tubular insert portion 15", desirably including the deformable end portion 17". In the illustrated embodiment, when the gripping member 9" is installed on the tubular insert portion 15", the gripping member 9" is carried substantially entirely on the fitting tube 7". In other words, the gripping member 9" has an inner surface and all or most of the inner surface engages the fitting tube 7" when the gripping member is received on the fitting tube. The gripping member 9" may have a length about the same as or slightly longer than the insert portion 15" so when the gripping member is installed on the insert portion all or most of the inner surface of the gripping member engages an outer surface of the insert portion. In the illustrated embodiment, the gripping member 9" has a length slightly longer than the insert portion 15". The internal diameter of the gripping member 9" is preferably the same or smaller than the outside diameter of the insert portion 15" so as to create an interference fit of the gripping member on the fitting tube 7". The conformable gripping member 9" is made of a relatively soft, conformable material. In the illustrated embodiment the gripping member 9" is a short piece of medical tubing having openings at both ends and being made of a suitable material such as a medical grade latex having a durometer of about 30-35 Shore A and a tensile strength of about 4000 psi. The precise material or durometer of the gripping member 9" may be other than described, but desirably the material is able to sealingly conform to rough and uneven surfaces such as may be found on a wall 19 of the entry passage of the corporation stop C to provide both sealing and large surface area engagement. As will be described, the gripping member 9" will be used to engage a substantial surface area of the wall 19 of the entry passage inside the lateral opening 3 for sealing, but also tightly gripping the corporation stop C to strongly resist dislodgement of the plug 1" under pressure. Gripping members having other configurations may be used without departing from the scope of the present invention.

The wedge 11" comprises a head (also indicated at 11") used for wedging the plug 1" into sealing and gripping engagement with the wall 19 of the entry passage of the corporation stop C. The head 11" has a proximal portion (e.g., at its proximal end) which has a lesser width than a distal portion of the head (e.g., at its distal end) for wedging the plug 1" into sealing and gripping engagement with the wall 19". In the illustrated embodiment, the head 11" has a frustoconical shape flaring outward from the proximal end to the distal end of the head and is free from an external thread. The wedge 11" has an internally threaded bore 27" in its proximal end. The wedge 11" can be made of any suitable material, such as Delrin® polyoxymethylene available from DuPont de Nemours and Company of Wilmington, Del. It will be understood that other suitable materials may be used. It is desirable that the wedge 11" be formed at least in part of the material that is harder than the material of the fitting tube 7" and the gripping member 9".

The bolt 35 includes a head 36 and a generally cylindrical threaded shaft 37. The thread on the shaft 37 is configured for threadably engaging the internally threaded bore of the wedge 27". The head 35 is sized and shaped to receive a tool for rotating the bolt 35 by engaging the head with the tool. In the illustrated embodiment, the head 36 has a regular geometric shape, and more specifically a hexagonal cross section to receive a tool having a corresponding regular geometric cross section such as a socket for rotating the bolt 35, as will be described hereinafter. The head 36 may have other shapes or cross sections without departing from the scope of the present invention. The bolt 35 can be made of any suitable material, such as Delrin® polyoxymethylene available from DuPont de Nemours and Company of Wilmington, Del.

Figure 10:
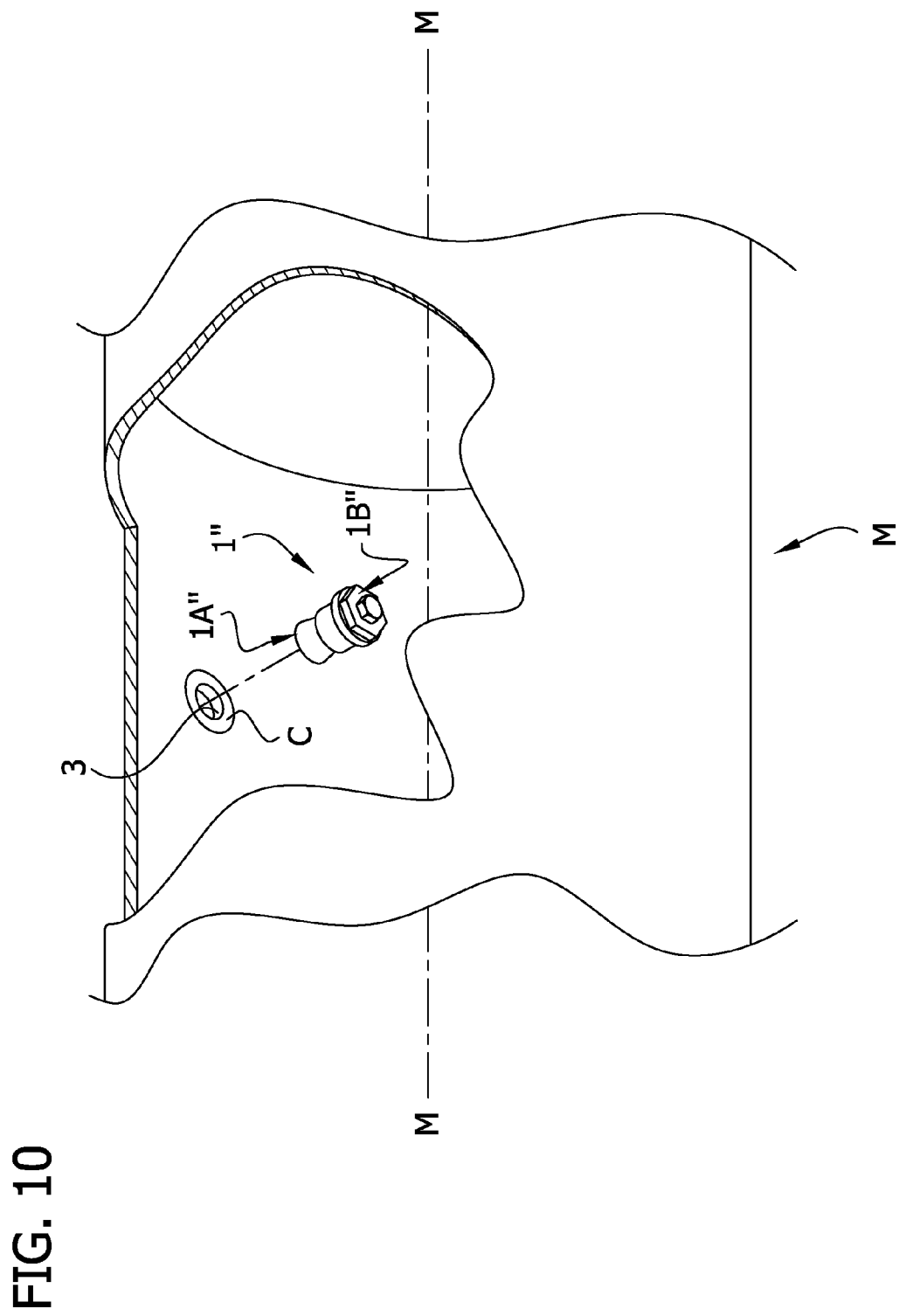
FIG. 10 is a fragmentary perspective of a water main with a part of the wall broken away to show the plug just prior to insertion into a lateral opening.

As assembled, the tubular gripping member 9" is pushed over the outer surface of the insert portion 15" of the fitting tube 7". The wedge 11" is positioned at the open distal end of the insert portion 15" of the fitting tube 7", and the threaded shaft of the bolt 37 is extended from the proximal end of the fitting tube into the through hole of the fitting tube into threaded engagement with the wedge. A distal side of the bolt head 36 rests against a proximal side of the fitting tube head 13" to prevent the bolt 35 from entirely entering the through hole of the fitting tube (i.e., to prevent axial movement of the bolt with respect to the fitting tube away from the flow area of the main pipeline M-M). As illustrated by the progression of FIGS. 10 and 11, the distal end of the assembled plug 1A" can be inserted through the lateral opening 3" into the corporation stop entry passage. In the entry passage, the plug 1" may initially appear as shown in FIG. 12. The head of the bolt 36 is accessible from the main pipeline M (at the proximal end of the plug 1B"). The clearance of the plug 1" with the wall 19 of the entry passage is greatly exaggerated in the drawings. In fact the plug 1" may engage the wall of the entry passage and could temporarily hold the plug from falling out of the lateral opening 3. A robot could then continue to hold the head of the fitting tube 13" to keep it from rotating and rotate the bolt 35 through its engagement with head of the bolt 36 with a tool from the proximal end of the plug 1B". The threaded engagement of the threaded shaft of the bolt 37 with the bore of the wedge 27" draws the wedge 11" into the fitting tube 7". In other words, rotation of the bolt 35 causes axial movement of the wedge 11" with respect to the fitting tube 7" toward the flow path of the main pipeline M-M. As shown in FIG. 13, the wedge 11" engages and wedges out the end portion 17" of the fitting tube 7" and the gripping member 9" into engagement with the wall 19 of the entry passage of the corporation stop C. A relatively small application of torque (e.g., 25 ft-lbs (34 N-m) or less) produces a fit between the plug 1" and the corporation stop C that can withstand a force of 100 lbs (445 N) to 150 lbs (667 N) or more from the water in the lateral line. The plug 1" will not leak and will protect the liner (not shown) from being collapsed under the pressure of the water from the lateral line.

The plug 1" may be sized for plugging lateral lines of various internal diameters. In one example, the plug 1" is constructed for plugging a 1 inch (2.54 cm) internal diameter lateral line and has the following dimensions, which are given by way of example and not limitation. The fitting tube 7" has an overall length of about 0.76 inches (1.93 cm). The tubular insert portion 15" has a length of about 0.4 inches (1.02 cm), an outside diameter of about 0.73 inches (1.85 cm), and an inside diameter of about 0.67 inches (1.70 cm). The grip portion 13A" is hexagonal and has a width of about 1 inch (2.54 cm) and a length of about 0.21 inches (0.53 cm). The lip 13B" has a diameter of about 1.28 inches (3.25 cm) and a length of about 0.15 inches (0.38 cm). The wedge 11" is about 0.8 inches (2.03 cm) long with a minimum thickness of about 0.6 inches (1.52 cm) and a maximum thickness of about 0.92 inches (2.34 cm). The bolt 35 is about 1.2 inches (3.05 cm) long. The threaded shaft 37 has a length of about 1 inch (2.54 cm) and a width of about 0.3 inches (0.76 cm), and the head 36 has a length of about 0.2 inches (0.51 cm) and a width of about 0.5 inches (1.27 cm). The corresponding threads on the wedge 11" and shaft 37 are formed at about 20 threads per inch (per 2.54 cm). The gripping member 9" has a length of about 0.4 to 0.6 inches (1.02 to 1.52 cm), and inside and outside diameters of about 0.7 inches (1.78 cm) and 1 inch (2.54 cm), respectively. The fitting tube 7, wedge 11, gripping member 9, and bolt 35 may have different sizes without departing from the scope of the present invention. For example, if the plug 1" is constructed for plugging a larger diameter lateral line (e.g., 2 inches (5.08 cm) vs. 1 inch (2.54 cm)), critical dimensions of the plug parts may be increased proportionally.

Figure 14:
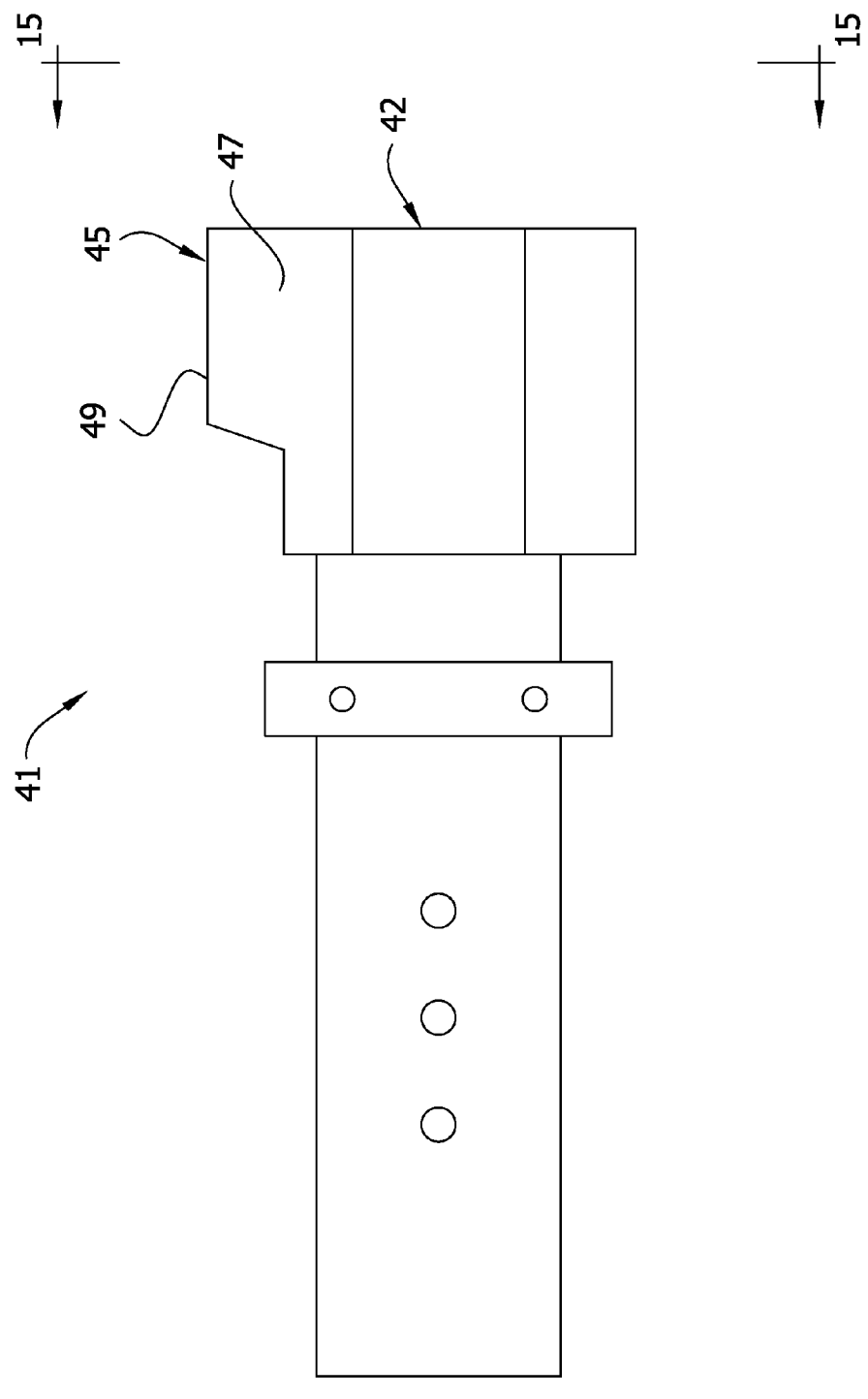
FIG. 14 is a schematic elevation of a tool for installing a plug of the present invention.
Figure 15A:
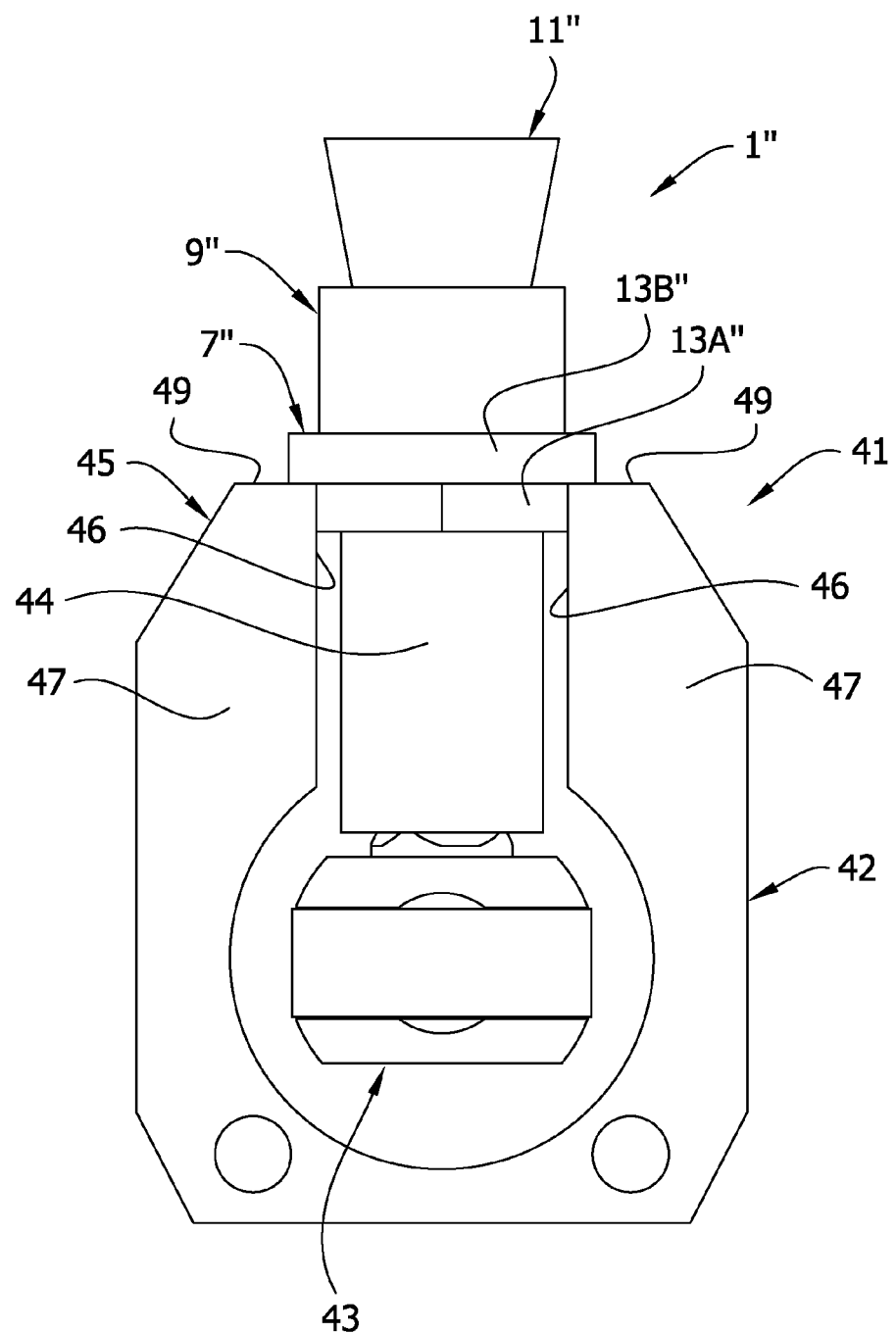
FIG. 15A is a schematic end view of the tool revealing a ratchet, the plug of FIG. 8 being shown on the tool for installation.

In one embodiment of the present invention, a robot (not shown) may be modified to include a tool such as tool 41 illustrated in FIGS. 14 and 15 for installing any of the plugs described above. The illustrated tool 41 is a ratchet assembly (also designated at 41). As an example, the assembly 41 will be described with respect to installation of the plug 1", which is shown on the assembly in FIG. 15. In general, the assembly 41 is used to rotate the head of the bolt 36 while simultaneously preventing rotation of the fitting tube 7" to cause the plug to expand and plug the lateral line.

The assembly 41 includes a housing 42 for receiving and holding a wrench 43, which in this embodiment is a ratchet. The ratchet 43 is powered by air and uses a gear reduction mechanism (not shown) to transform the high speed air motor rotations into low speed, higher torque output. Oscillating head air ratchet wrenches of this general type are available in the market place and frequently used in automotive repair work. Other types of ratchets, such as electric ratchets (e.g., battery-powered ratchets), may be used without departing from the scope of the present invention. The assembly 41 includes a bit 44 which is provided on the ratchet 40. The bit 44 is constructed for engaging the bolt head 36 for rotating the bolt. More specifically, the bit 44 has a regular geometric shape corresponding to the regular geometric shape of the bolt head 36. In the illustrated embodiment, the bit 44 is a socket configured for engaging and rotating the hexagonal bolt head 36.

The assembly 41 also includes a grip 45 for gripping the fitting tube 7". The grip 45 is positioned on the assembly 41 with respect to the bit 44 so the bit and the grip can engage simultaneously the bolt head 36 and the fitting tube 7", respectively. The grip 45 defines an opening above the bit 44 having opposing surfaces 46 for engaging opposite surfaces of the fitting tube 7". In the illustrated embodiment, the grip 45 comprises two arms 47 extending from the housing 42 on opposite sides of the bit 44. The arms 47 are spaced from each other for receiving the proximal end of the fitting tube 7" between the arms when the head of the bolt 36 is engaged with the socket 44. The arms 47 define the opposing surfaces 46 at distal ends of the arms. In this embodiment, the opposing surfaces 46 are generally flat and parallel for engaging opposite surfaces of the grip portion of the fitting tube head 13A". The arms may also define surfaces 49 which engage a proximal side of the lip 13B".

The tool 41 may be mounted on a robot (not shown) configured and sized for navigating within a pipeline to be lined. As explained above, an example of an assembly including a robot is disclosed in detail in U.S. patent application Ser. No. 11/796,379 (the '379 Application). The robot disclosed in the '379 Application may be suitably modified to receive the tool 41. Several plugs may be stored on the robot assembly so that numerous connections may be plugged in a single trip of the robot down the pipeline.

In use, the assembly 41 engages the plug 1" as shown in FIG. 15 so the bit 44 engages the bolt head 36 and the grip 45 engages the fitting tube head 13". The ratchet 43 is energized to rotate the bolt 35. Engagement of the fitting tube head 13"

with the grip 45 prevents the fitting tube 7" from rotating. Rotation of the bolt 35 causes axial movement of the wedge 11" with respect to the fitting tube 7" toward the flow path of the main pipeline M-M, which causes the wedge to wedge the deformable portion 17" outward. The ratchet 43 rotates the bolt 35 until the plug 1" plugs the lateral line.

Figure 15B:
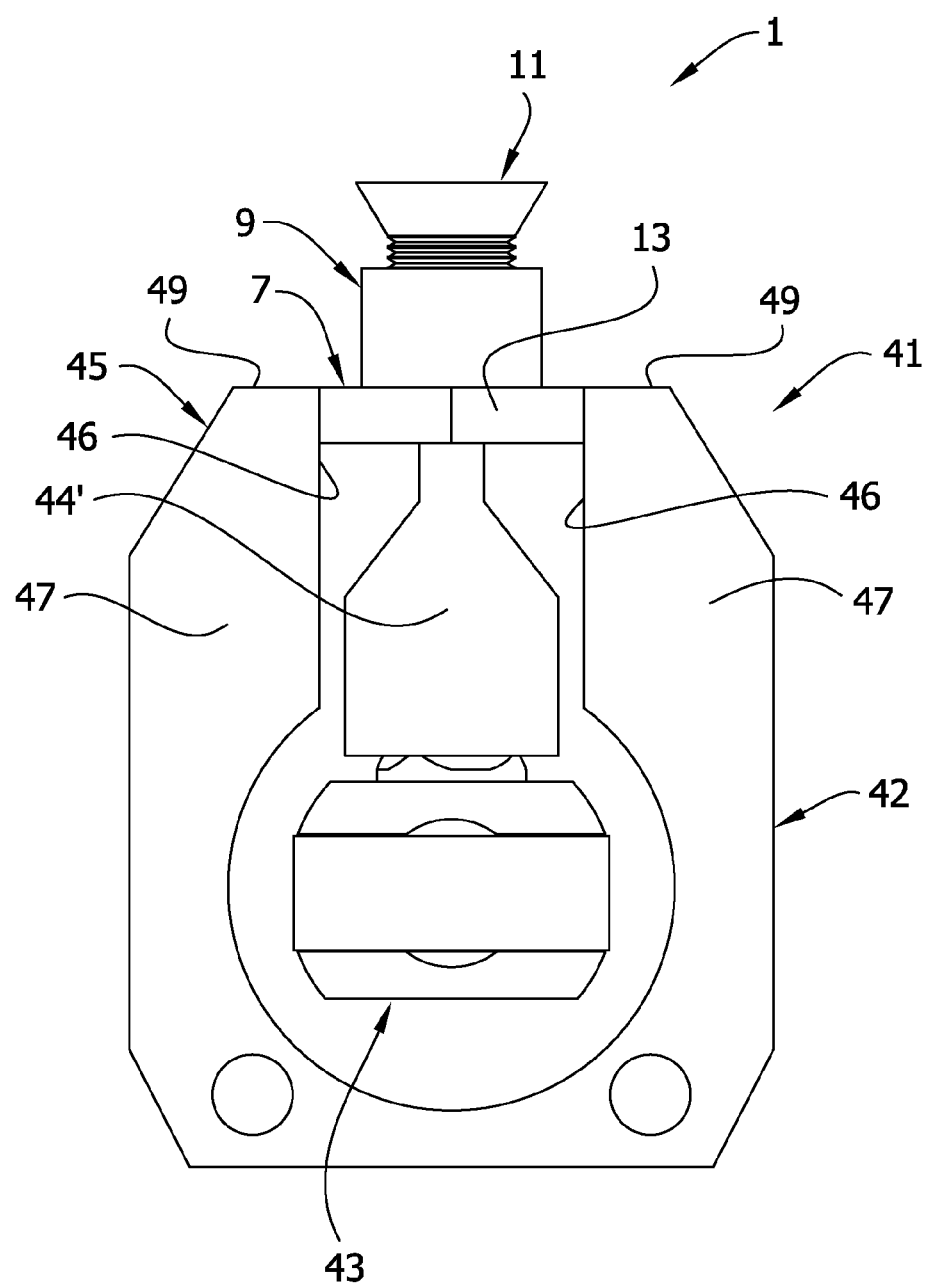
FIG. 15B is a schematic end view of the tool with a different bit and the plug of FIG. 1 being shown on the tool for installation.

The assembly 41 may be suitably modified for installing differently sized plugs and plugs having different configurations such as plug 1 and plug 1' described above. For example, as shown in FIG. 15B, the assembly 41 may be modified for installing the plug 1 by replacing or supplementing the bit 44 with a different bit 44' constructed for engaging and rotating the wedge 11. For example, the bit 44' may have a regular geometric shape (e.g., hexagonal or Allen wrench type) corresponding to the shape of the bore 27. The bit 44' is positioned on the attachment 41 with respect to the grip 45 so the bit and the grip engage simultaneously the wedge bore 27 and the fitting tube 7, respectively, for rotating the wedge and holding the fitting tube from rotation.

Tools other than those described herein including other types of ratchet assemblies may be used to install plugs according to the present invention without departing from the scope of the present invention. For example, the grip may have a different configuration (e.g., socket-type construction), and different types of bits may be used.

Figure 17:
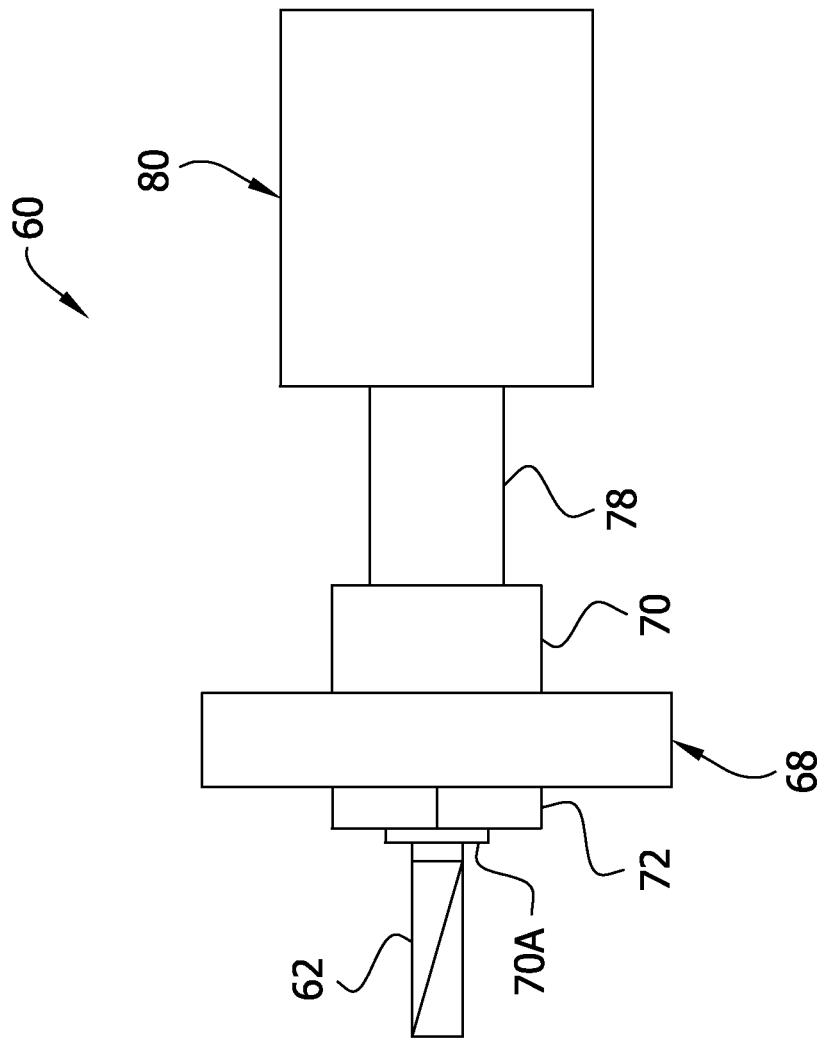
FIG. 17 is a diagrammatic elevation of the cutting and brushing assembly assembled with the air motor.
Figure 18:
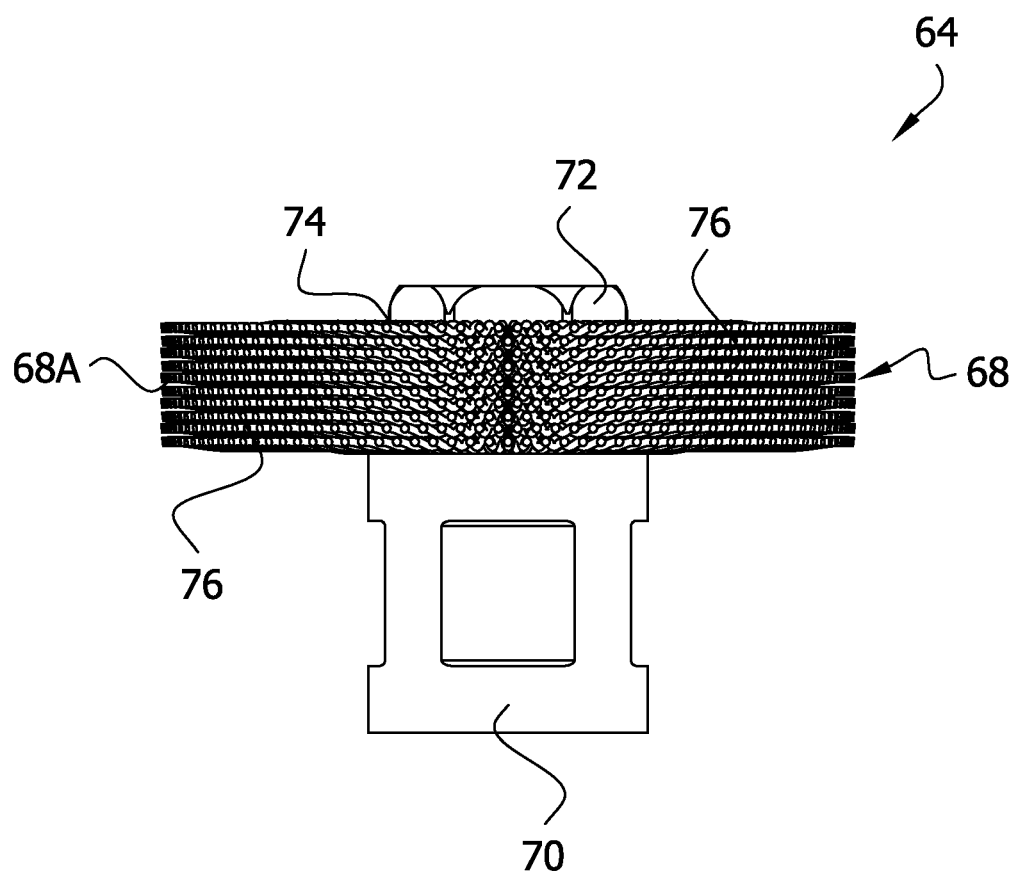
FIG. 18 is an elevation of a brush subassembly of the cutting and brushing assembly.
Figure 19:
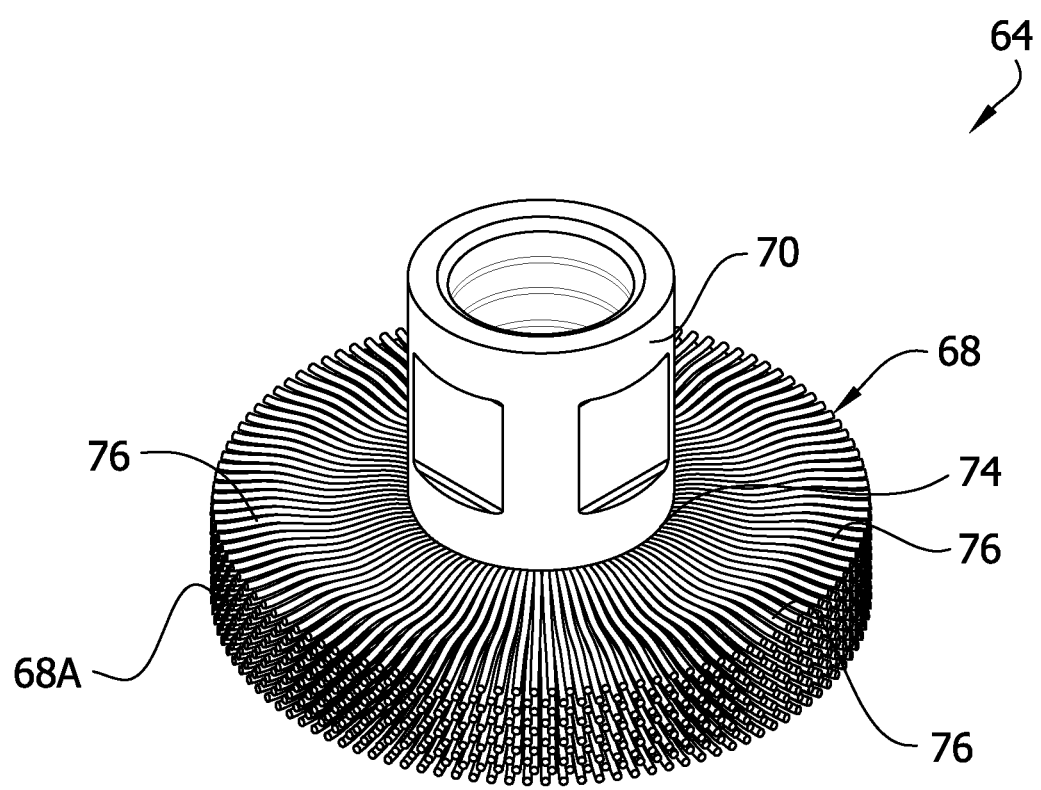
FIG. 19 is a perspective of the brush subassembly.
Figure 20:
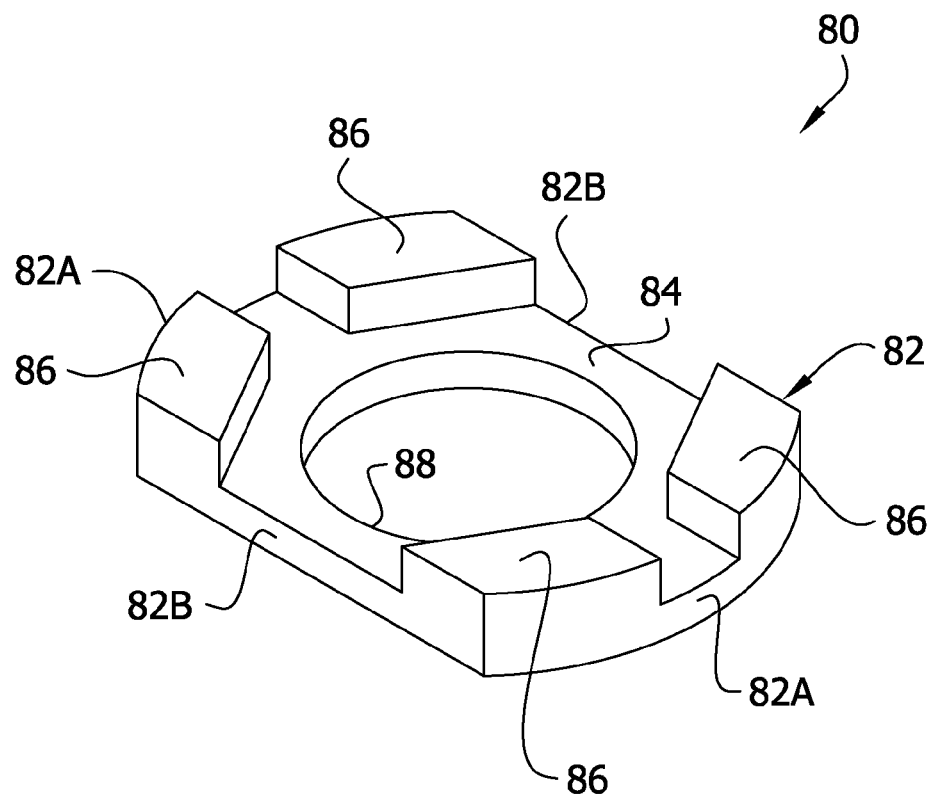
FIG. 20 is a perspective of a fitting for a plug of the present invention.
Figure 21:
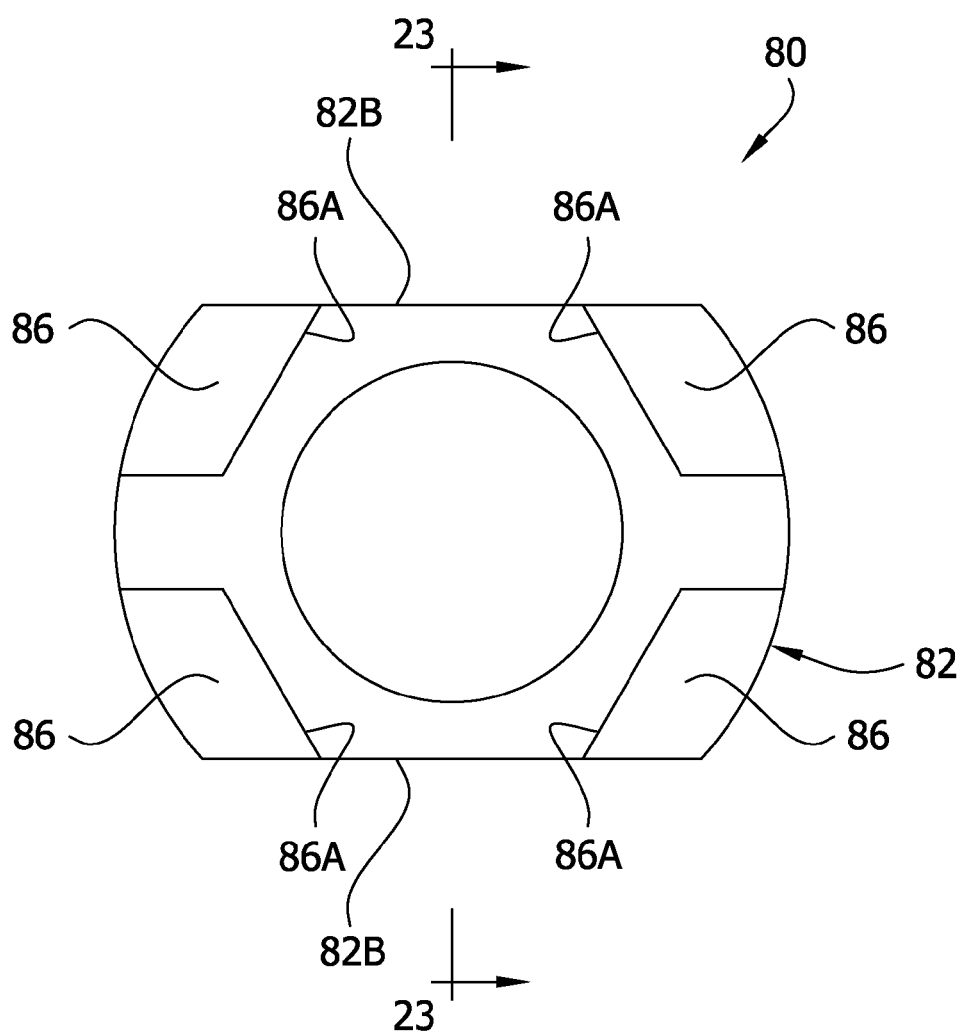
FIG. 21 is a top view of the fitting.
Figure 22:
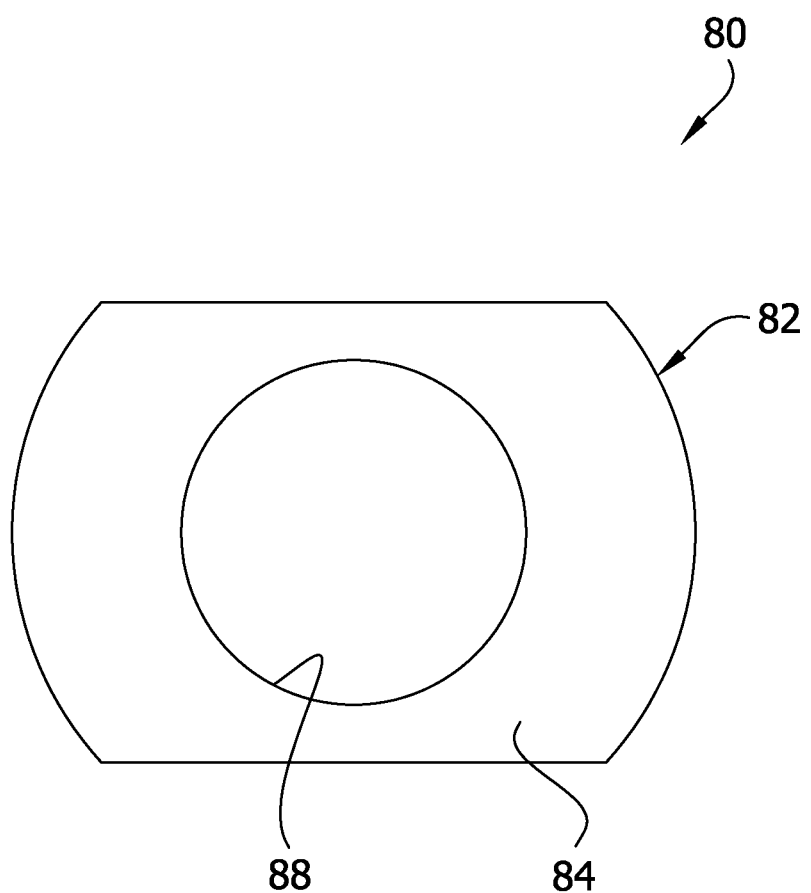
FIG. 22 is a bottom view of the fitting.
Figure 23:
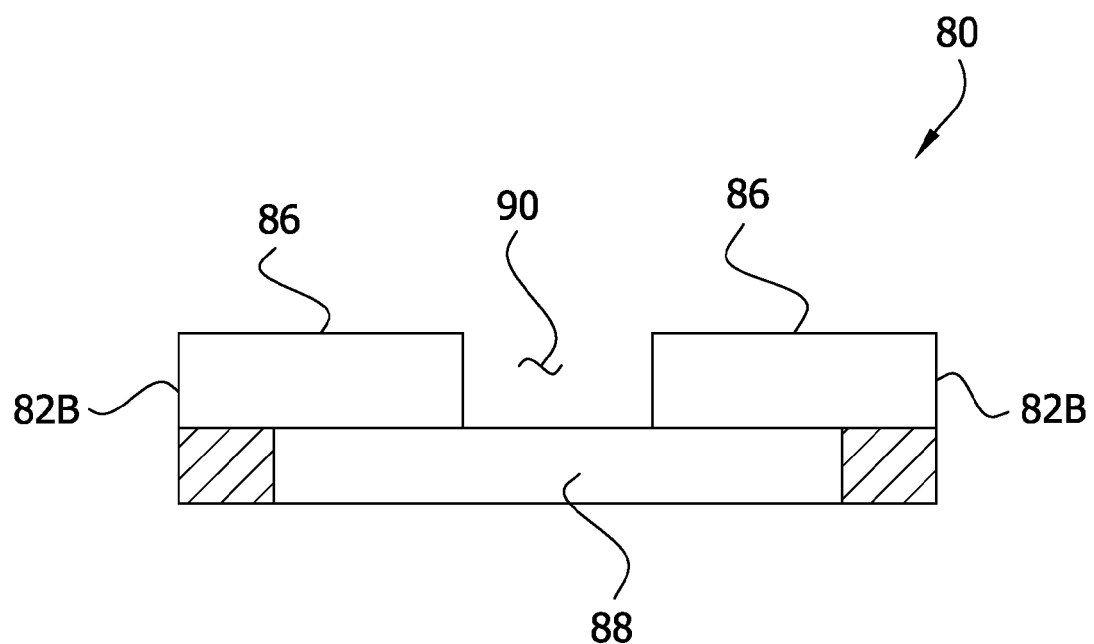
FIG. 23 is a section of the fitting taken in the plane including line 23-23 in FIG. 21.

FIGS. 16 and 17 illustrate schematically a cutting and brushing assembly 60 for restoring connections between plugged lateral lines and a main pipeline after lining the main pipeline. In general, the assembly 60 is used in the main pipeline to form openings in the cured in place liner and remove the plugs from the lateral lines, as described in further detail below. The cutting and brushing assembly 60 includes a cutting bit 62, a brush subassembly 64, and a collet subassembly 66. The brush subassembly 64 includes a brush 68, a first nut 70 having a threaded stem 70A, and a second nut 72 having internal threads corresponding to the threads on the threaded stem. The brush subassembly 64 is shown separately in FIGS. 18 and 19. The brush 64 includes an annular body 74 having bristles 76 extending radially outward from the annular body. The annular body of the brush 74 is received on the threaded stem of the first nut 70, and the second nut 72 is threaded onto the stem to secure the brush 68 on the stem and hold it from rotation with respect to the stem. The collet subassembly 66 includes a collet 76 and a collet body 78. The cutting bit 62 is passed through the brush subassembly 64 and into the collet 76 which is received in the collet body 78. The cutting and brushing assembly 60 is configured so that the cutting bit 62 and the brush 68 rotate conjointly. For example, the collet subassembly 66 may be configured to hold the cutting bit 62 and the brush subassembly 64 from rotation with respect to the collet subassembly.

When assembled, as shown in FIG. 17, a distal end of the cutting bit 62 forms a distal end of the cutting and brushing assembly 60. The brush body 74 is connected to the cutting bit 62 and spaced from the distal end of the cutting bit. The brush 68 is wider than the cutting bit 62 so the brush contacts a wider portion of the plug to be removed than the cutting bit. At least some of the bristles 76 form a generally circular outer edge of the brush 68A, and the outer edge has a diameter greater than the width of the cutting bit 62. The brush 68 desirably has a diameter about the same as an outer diameter of a plug to be removed (e.g., ¾ inches (1.91 cm) to 2 inches (5.08 cm)) so substantially all parts of the plug have been loosened from the lateral line after the brush has passed through the lateral opening. Moreover, the brush may be wide enough to contact and clean the surface of the lateral line at the lateral opening. Brushes having different configurations (e.g., different diameters or different bristle lengths) may be used without departing from the scope of the present invention.

As with the tool 41, the cutting and brushing assembly 60 may be mounted on a robot sized and configured for navigating the pipeline to be lined. An air motor mounted on a robot for rotating the assembly 60 is shown schematically and indicated at 80. In the illustrated embodiment, the collet subassembly 66 serves as a mount for mounting the cutting and brushing assembly 60 on the air motor on the robot. The brush 68 is positioned between the mount 66 and the distal end of the cutting bit 62. In other words, the mount 66 is located on a first side of the brush and the distal end of the cutting bit is located on a second opposite side of the brush. In the illustrated embodiment, the brush 68 is positioned directly between the mount 66 and the distal end of the cutting bit 62. Other types of mounts may be used without departing from the scope of the present invention.

Referring to FIGS. 20-25, a fitting 80 may be configured for use with a plug described above to facilitate installation and removal of the plug. As an example, the fitting 80 will be described with respect to use with the plug 1", but it is understood the fitting may be used with plug 1 or any other type of plug according to the present invention. In general, the fitting 80 is fitted on the fitting tube 7" to facilitate gripping of the fitting tube by the robot. The fitting 80 may be made of a material that facilitates detection of the plug 1" for removal of the plug after lining the main pipeline. In one embodiment, the fitting 80 is made of brass.

As shown in FIGS. 20-23, the fitting 80 comprises a generally oblong body 82 having a base 84 and a grip in the form of four protrusions or fingers 86 extending upward from four corners of the base. The body 82 has opposite arcuate ends 82A and opposite generally flat sides 82B extending between the ends. The base 84 has a generally flat bottom (FIG. 22) and an opening in the form of a circular hole 88 between the arcuate ends inboard from the columns 86. The fingers 86 are spaced from one another and have side surfaces 86A oriented generally toward each other defining a cavity 90 (FIG. 23) between the columns for receiving the fitting tube 7". More specifically, the side surfaces 86A are positioned with respect to each other for receiving and holding the hexagonal grip portion of a fitting tube 13A".

Figure 24:
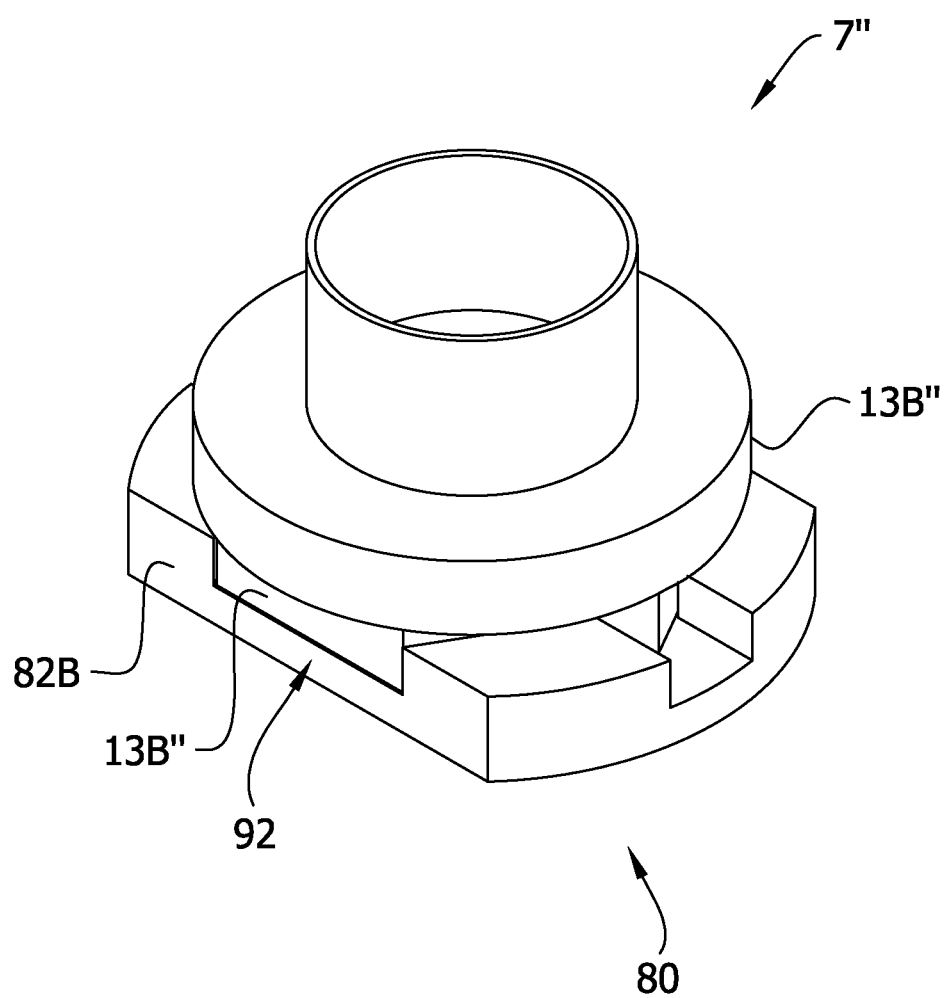
FIG. 24 is a perspective of a fitting tube of the plug of FIG. 8 on the fitting.

FIG. 24 shows the fitting tube 7" on the fitting, with the hexagonal grip portion 13A" positioned in the cavity. Desirably, the side surfaces of the fingers 86A are spaced so the fingers 86 form an interference fit with the fitting tube 7". The fitting 80 is sized so its opposite generally flat sides 82B form generally uniform flat surfaces 92 with sides of the grip portion of the fitting tube 13A" (only one surface 92 being shown in FIG. 24). In other words, each opposite generally flat surface 82B is generally coplanar with a respective side surface of the grip portion of the fitting tube 13A" forming the surfaces 92. The surfaces are gripping surfaces that facilitate gripping of the fitting tube 7". For example, the tool 41 illustrated in FIGS. 14 and 15 and described above may be used to install the plug 1" using the fitting 80. More specifically, the opposing side surfaces 46 of the grip 45 are spaced to engage the opposite gripping surfaces of the combined fitting tube and fitting 92. The gripping surfaces 92 provide a larger surface area than the side surfaces of the grip portion of the fitting tube 13A" and thus increase the tolerance for gripping the fitting tube 7" with the grip 45 to hold the fitting tube from rotation.

Figure 25:
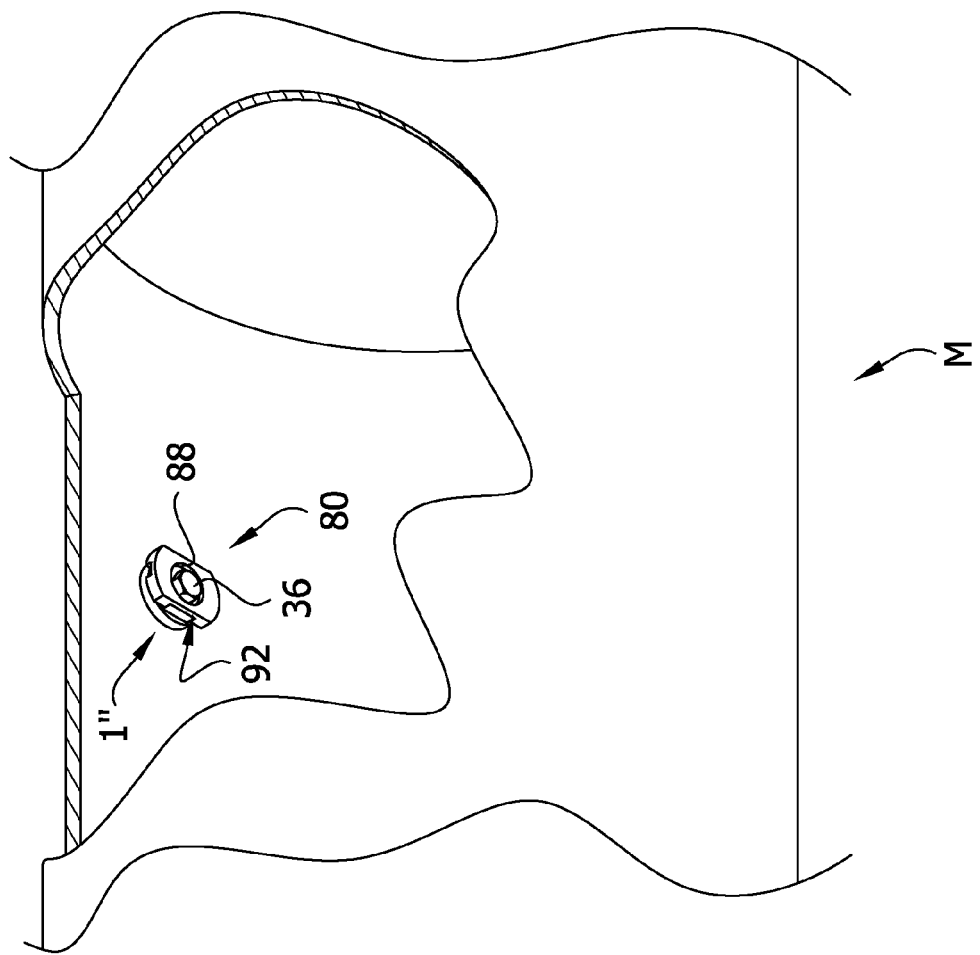
FIG. 25 is the fragmentary perspective of FIG. 10 with the fitting on the plug.

Referring to FIG. 25, the fitting 80 is shown on the plug 1" inserted in a lateral opening of the main pipeline M. As shown, the opening 88 in the fitting provides access to the bolt head 36 from the main pipeline M. The grip of the tool 45 engages the gripping surfaces of the combined fitting tube and fitting 92, and the bit 44 engages and rotates the bolt head 36 to tighten the plug 1". The fitting 80 may be removed or remain on the fitting tube 7" after installation of the plug 1".

If the fitting 80 remains on the plug 1" after installation, the fitting may be used to detect or locate the plug after lining the main pipeline M. The fitting 80 may be made of conductive material such as a metal detectable by the robot. For example, the fitting 80 may be made of brass, and the robot may include an eddy current probe for detecting the fitting using eddy current technology. Use of an example robot and an eddy current probe is disclosed in detail in co-assigned U.S. patent application Ser. No. 11/796,379 (the '379 Application). After detecting the fitting 80, the robot may use a tool such as the cutting and brushing assembly 60 to remove the plug.

As explained above, the fitting may be used with other types of plugs. For example, the fitting could be used for installing the plug 1. In particular, the fitting would be sized to fit the hexagonal head of the fitting tube 1 like the grip portion of the fitting tube 1", and the opening in the fitting would provide access for the tool to engage the wedge bore and rotate the wedge to tighten the plug.

Fittings having configurations other than described herein do not depart from the scope of the present invention. For example, the fitting may have an entirely different shape, may have two columns instead of four, and may have more than two generally flat sides.

A method according to the present invention of plugging lateral lines from a main pipeline, lining the main pipeline, and then reinstating flow between the lateral lines and the lined main pipeline may be summarized as follows. A main pipeline to be rehabilitated (e.g., pipeline M) is selected. A temporary bypass system (e.g., hose system) may be installed to provide continued service to areas normally serviced by the main pipeline. Service through the main pipeline is then temporarily discontinued, and the main pipeline may be cleaned using conventional methods. The robot is then inserted within the main pipeline and navigated to lateral openings in the main pipeline such as at connections of the main pipeline with lateral lines and service connections such as corporation stops.

The robot manipulates a tool such as the tool 41 mounted on the robot to place a plug (e.g., any of the plugs described above) on the ratchet and insert the plug into the connection. In the case of the plug 1, the tool engages the hex head of the fitting tube 13 and engages the bore of the wedge 27. The tool rotates the wedge 11 while holding the fitting tube 7 from rotation so that the threaded engagement of the wedge with the fitting tube draws the wedge into the fitting tube and brings the gripping member 9 into engagement with the wall of the entry passage of the lateral line. As explained above, a relatively small application of torque produces a fit between the plug and the wall of the entry passage. In the case of the plug 1", the tool 41 engages the grip portion 13K of the fitting tube and engages the bolt 35. The tool 41 rotates the bolt 35 while holding the fitting tube 7" from rotation so that the threaded engagement of the bolt and the wedge 11" draws the wedge into the fitting tube and brings the gripping member 9" into engagement with the wall of the entry passage of the lateral line. The fitting 80 may be used to facilitate installation of either plug 1 or plug 1". As installed, the plugs 1, 1" isolate the main pipeline from the lateral lines.

After installation of the plugs, the main pipeline M may be lined with a cured in place liner. After the resin in the liner is cured, the robot may be reinserted in the main pipeline M to reinstate the connections of the main pipeline with the lateral lines. The robot is equipped with the cutting and brushing assembly 60. The robot is navigated within the main pipeline M to the connections desired to be reinstated. The robot manipulates the cutting and brushing assembly 60 to position it adjacent the connection. The robot then rotates the cutting and brushing assembly 60 and advances it toward the plug so that the cutting bit forms an opening in the cured in place liner and continues into the plug to drill out the plug. The assembly 60 is advanced into the connection (e.g., the entry passage of the corporation stop) to an extent such that the brush 68 rotating in unison with the cutting bit 62 forms a larger opening in the cured in place liner and moves sufficiently into the connection to loosen and remove all portions of the plug and clean the connection to reinstate free flow between the main pipeline and the lateral line. The debris from the plug can be flushed away.

Figure 26A:
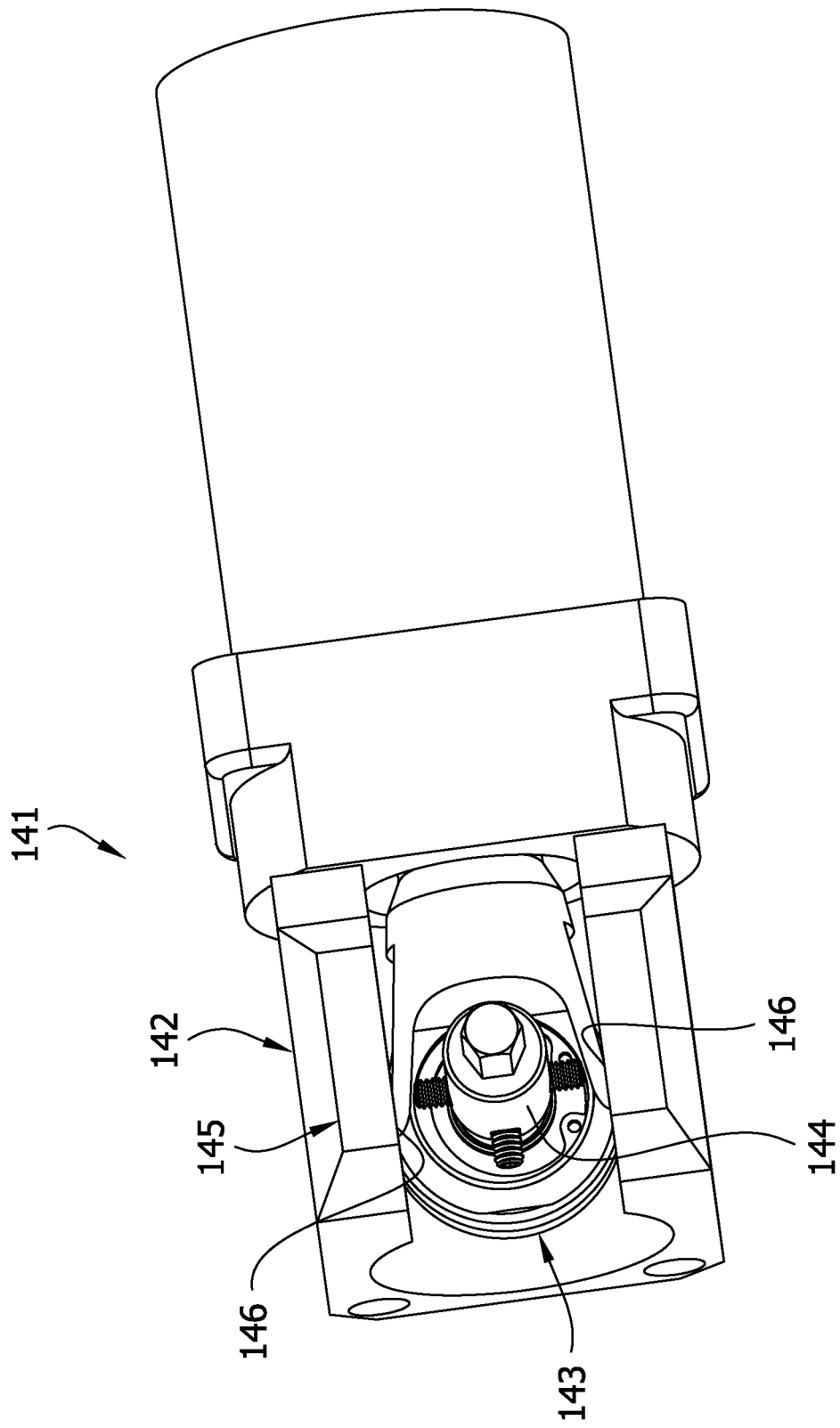
FIG. 26A is a perspective of a tool of another embodiment of the present invention.
Figure 26B:
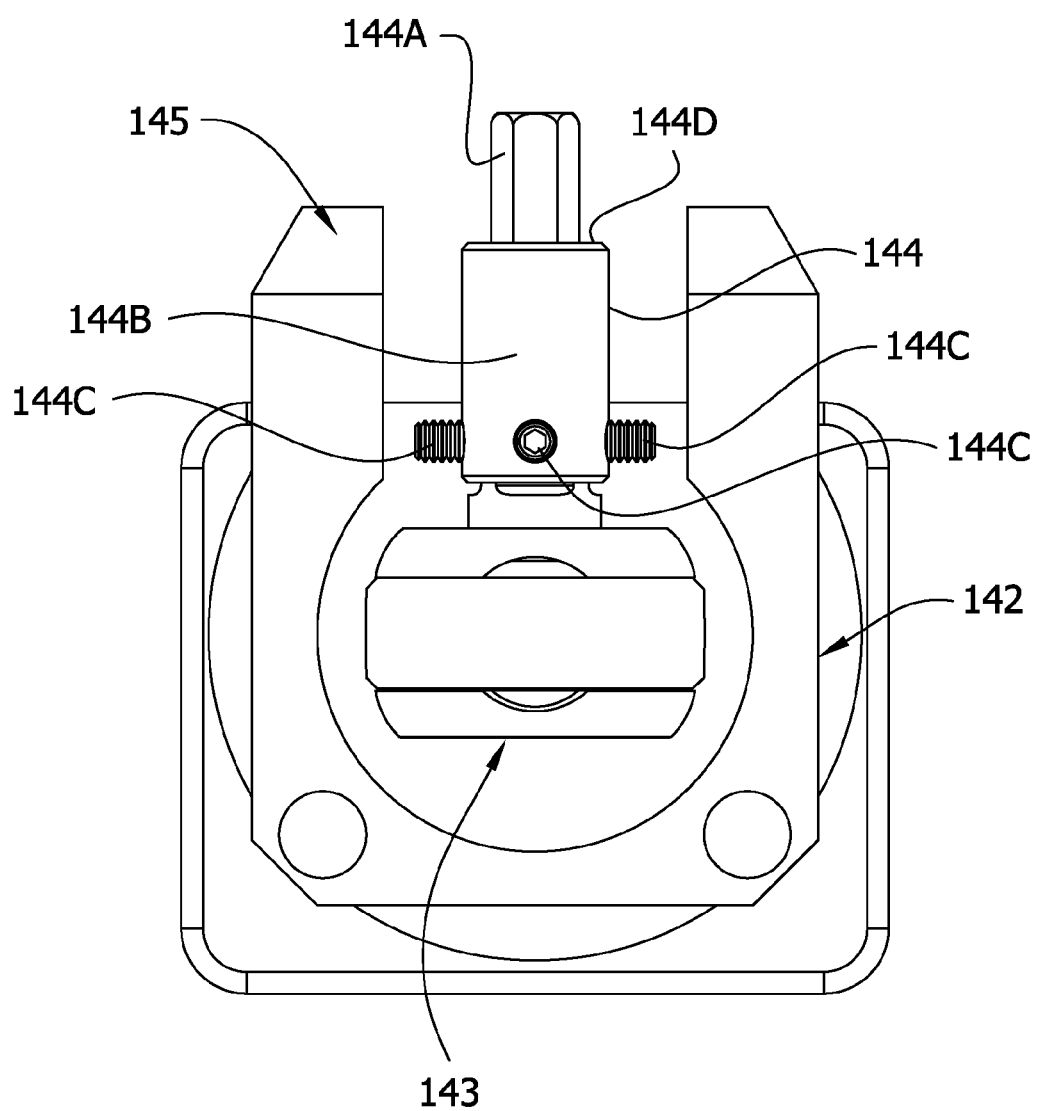
FIG. 26B is an end view of the tool of FIG. 26A.

FIGS. 26A and 26B illustrate another embodiment of a tool, generally indicated by the reference number 141. The tool is similar to the tool 41 described above, and like parts are indicated by corresponding reference numbers, plus 100. The tool 141 in this embodiment is a ratchet assembly including a housing 142 and a wrench 143, which is illustrated as an air-powered ratchet. The assembly 141 also includes a grip 145 having opposing gripping surfaces 146. A bit 144 installed on the ratchet 143 is similar to bit 44' (FIG. 15B) and configured for installing plugs such as the plug 1 described above. In particular, as shown in FIG. 26B, the bit 144 has a head 144A which has a regular geometric shape (e.g., hexagonal or Allen wrench type) corresponding to the shape of the wedge bore 27. The bit 144 is positioned on the attachment 141 with respect to the grip 145 so the bit and the grip can engage the wedge bore 27 and the fitting tube 7, respectively, for simultaneously rotating the wedge and holding the fitting tube from rotation. The bit 144 includes a connecting portion 144B for connecting to the ratchet 143. In the illustrated embodiment, the connecting portion 144B comprises a generally smooth walled cylindrical segment and a bore into which a protrusion from the ratchet is receivable (not shown). Two pairs of opposing set screws 144C extend into the bore for tightening against the protrusion to secure the bit 144 on the ratchet. The bit 144 has a shoulder between the head 144A and the connecting portion 144B that defines a supporting surface 144D for supporting the proximal side of the head 13 of the fitting tube 7 when the plug 1 is on the tool. Like the assembly 41 described above, the assembly 141 is used to rotate the wedge 11 while simultaneously preventing rotation of the fitting tube 7 to cause the plug 1 to expand and plug the lateral line. The assembly 141 may be modified without departing from the scope of the present invention. For example, the head of the bit may have a different shape, the bit may have a different number of set screws, or the bit may be configured differently (e.g., as a socket) for installing a different type of plug.

Figure 27A:
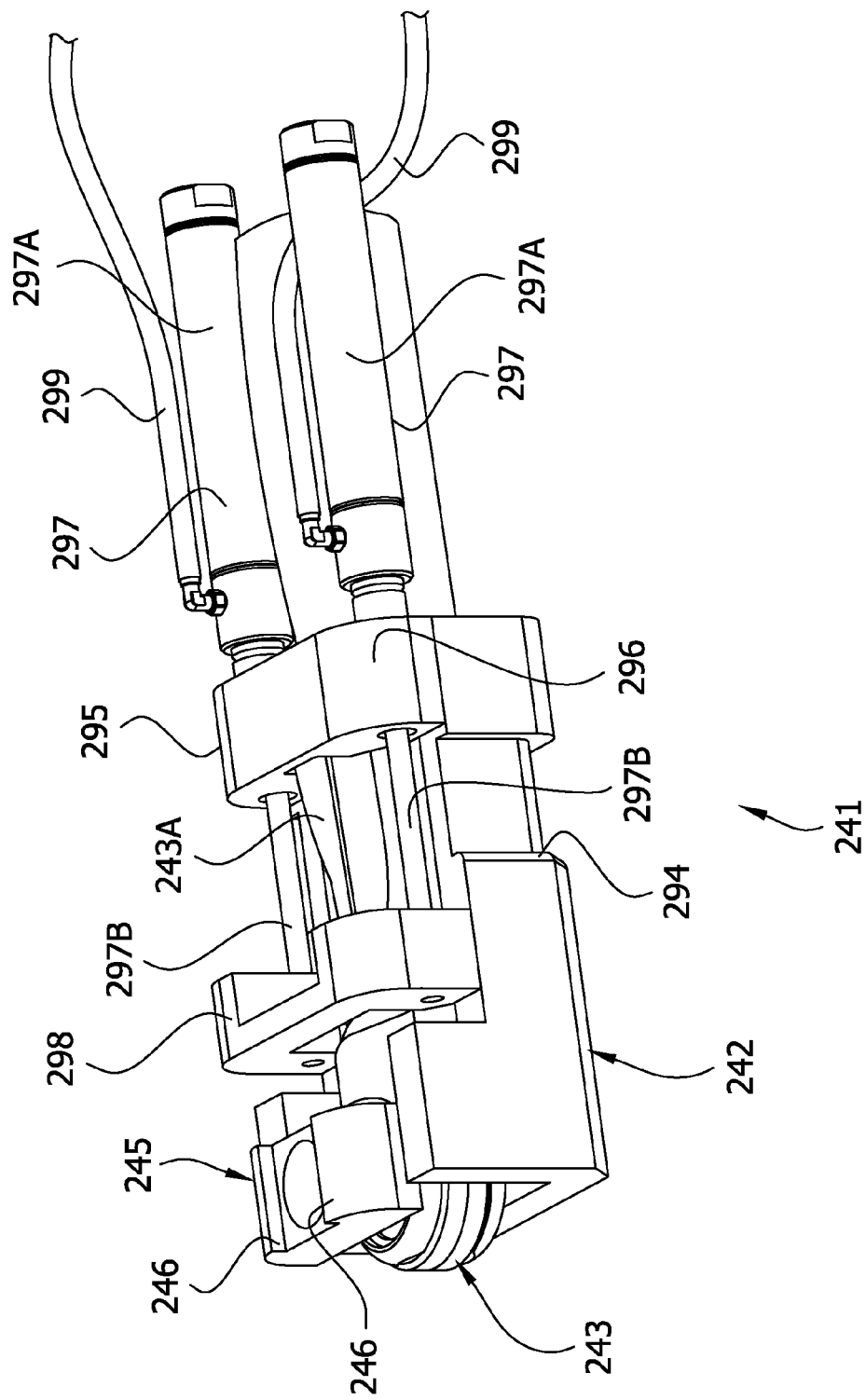
FIG. 27A is a perspective of a tool of yet another embodiment of the present invention, an actuation mechanism of the tool being shown in a first or extended position in which the tool is not energized.
Figure 27B:
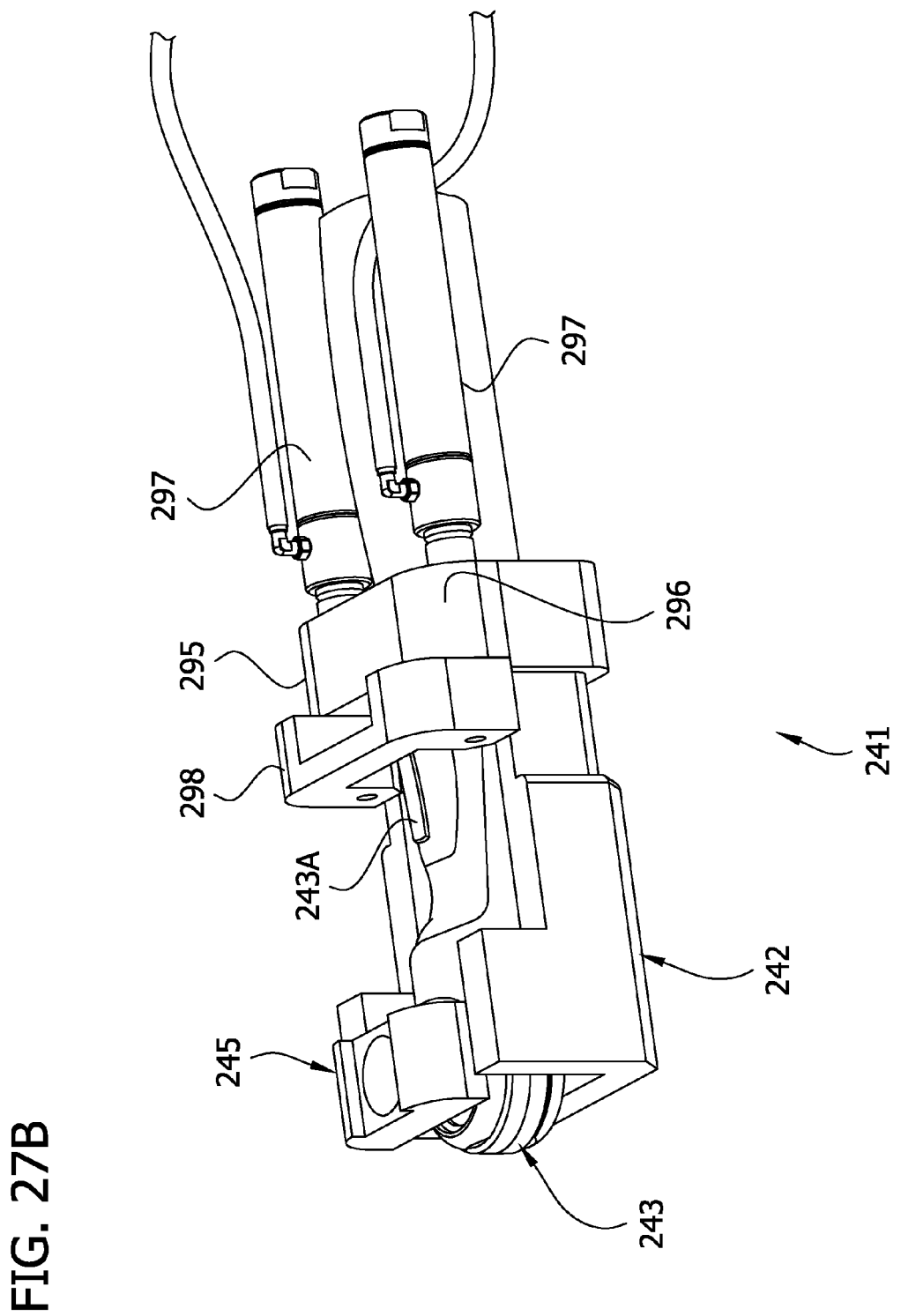
FIG. 27B is the perspective of FIG. 27A with the actuation mechanism being shown in a second or retracted position in which the tool is energized.

FIGS. 27A and 27B illustrate yet another embodiment of a tool, generally indicated by the reference number 241. The tool 241 is similar in several respects to the tool 41 described above, and like parts are indicated by corresponding reference numbers, plus 200. For example, the tool 241 is a ratchet assembly including a housing 242, a wrench 243, and a grip 245 having opposing gripping surfaces 246. In this embodiment the wrench 243 is a battery-powered ratchet, such as a cordless lithium-ion right angle driver available from Milwaukee Electric Tool Corporation of Brookfield, Wis. The ratchet 243 includes a motor operatively connected to a portable battery for energizing the motor. A bit such as any of the bits 44, 44', 144 described above may be installed on the ratchet 243 to be rotated by the motor so the ratchet may be used for installing different types of plugs such as the plugs 1 or 1". The ratchet 243 has a trigger 243A for energizing the ratchet to rotate the bit. The trigger 243A has an "on" position in which the trigger is pressed to energize the ratchet 243 and an "off" position in which the trigger is not pressed and the ratchet is de-energized.

The housing 242 comprises a bed 294 for supporting the ratchet 243 and an actuation mechanism 295 configured for selectively pressing the trigger 243A for energizing the ratchet when desired. The actuation mechanism 295 includes a brace 296, two pistons 297, and an actuator 298. The brace 296 is secured to the bed 294 over the ratchet 243. The pistons 297 are connected to the brace 296 and have housings 297A extending from a first side of the brace. The pistons 297 include drive shafts 297B which extend through the brace 296 and have distal ends connected to the actuator 298 on a second side of the brace opposite the first side. The pistons 297 are operatively connected via conduits 299 to a source of fluid (e.g., air), which may be located on the robot or remotely from the robot (e.g. outside the main pipeline). In the illustrated embodiment, the actuator 298 is a slide member. The slide member 298 is selectively movable by the pistons 297 between a first or "extended" position shown in FIG. 27A and a second or "retracted" position shown in FIG. 27B. In the first position, the slide member 298 does not press the trigger 243A so the ratchet 243 is not energized. In the second position, the slide member presses the trigger 243A to energize the ratchet 243. An operator can control the position of the slide member 298 by controlling air pressure in the pistons 297 from outside the main pipeline. In the illustrated embodiment, the pistons 297 move the slide member 298 in a direction generally parallel to a longitudinal axis of the ratchet 243. The trigger 243A has a tapered shape so that the slide member 298 increasingly presses the trigger as the pistons 297 move the slide member closer to the brace 296. The tool 241 may include suitable connection structure (not shown) for mounting the tool on a robot as described above. Actuation mechanisms having other configurations may be used without departing from the scope of the present invention. For example, the actuation mechanism may include a different number of pistons (e.g., zero, one, three, or more) and may have a different actuator (e.g., a pivot member instead of a slide member) for pressing the trigger.

In use, a plug such as one of the plugs 1 or 1" described above is installed on the assembly 241 such that the bit engages the wedge or bolt of the plug and the grip 245 engages the fitting tube. Like the assembly 41 described above, the assembly 241 is used to rotate the wedge or bolt while simultaneously preventing rotation of the fitting tube to cause the plug to expand and plug the lateral line. When the plug is positioned in a lateral opening, the slide member 298 is moved from the first position (e.g., FIG. 27A) to the second position (e.g., FIG. 27B) to energize the motor to cause the bit to rotate the wedge or bolt while the fitting tube is held from rotation to tighten the plug in the lateral line, as described above.

Tools other than those described herein including other types of ratchet assemblies may be used to install plugs according to the present invention without departing from the scope of the present invention.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

OTHER STATEMENTS OF THE INVENTION

Three-Piece Plug

A1. A plug for temporarily plugging a lateral line from a lateral opening in a main pipeline, the plug having a distal end which in use is inserted in the lateral line and a proximal end which in use is positioned closer to a flow path in the main pipeline than the distal end, the plug comprising:

a one piece fitting tube sized and shaped for being inserted at least partially in the lateral line, the fitting tube having a deformable portion and a through hole extending through the fitting tube from a proximal end of the fitting tube to a distal end of the fitting tube, the fitting tube having a thread on an inner surface of the through hole; and a wedge sized and shaped to be at least partially receivable in the through hole of the fitting tube from the distal end of the fitting tube, the wedge having an external thread corresponding to the thread on the inner surface of the through hole of the fitting tube for threadably engaging the fitting tube, the wedge including a head constructed for deforming the deformable portion of the fitting tube outward to plug the lateral opening, the head having a proximal portion having a lesser width than a distal portion of the head; and whereby in use the wedge is inserted in and in threaded engagement with the through hole of the fitting tube from the distal end of the fitting tube and rotation of the wedge causes axial movement of the wedge with respect to the fitting tube toward the flow path of the main pipeline and causes the head of the wedge to deform the deformable portion of the fitting tube outward to plug the lateral line.

A2. A plug as set forth in claim A1 wherein the head of the wedge has a frustoconical shape and flares outward from the proximal portion to the distal portion.

A3. A plug as set forth in claim A1 wherein the wedge has a bore accessible through the through hole of the fitting tube from the proximal end of the plug, the bore being sized and shaped to receive a tool for rotating the wedge by engaging the bore with the tool.

A4. A plug as set forth in claim 3 wherein the bore of the wedge has a regular geometric shape for engaging a tool having a corresponding regular geometric shape.

A5. A plug as set forth in claim 3 wherein the bore is free from an internal thread.

A6. A plug as set forth in claim A1 wherein the wedge further comprises a generally cylindrical shaft having a distal end connected to the head of the wedge and the external thread is on an outer surface of the shaft.

A7. A plug as set forth in claim A1 wherein the fitting tube comprises a head and a tubular insert portion, a distal end of the head being connected to a proximal end of the tubular insert portion.

A8. A plug as set forth in claim A7 wherein the deformable portion of the fitting tube is free from an internal thread.

A9. A plug as set forth in claim A7 wherein the head of the fitting tube has a regular geometric shape to facilitate gripping by a tool for holding the head from rotation when the plug is inserted in the lateral line.

A10. A plug as set forth in claim A1 further comprising a gripping member sized and shaped for being inserted at least partially in the lateral line, the gripping member having an opening permitting the gripping member to be received around an outer surface of the fitting tube, whereby in use the gripping member is on the outer surface of the fitting tube and outward deformation of the deformable portion of the fitting tube causes the gripping member to deform outward to plug the lateral line.

A11. A plug as set forth in claim A10 wherein the opening of the gripping member has an internal diameter which is smaller than an outer diameter of the fitting tube to create an interference fit between the gripping member and the fitting tube when the gripping member is on the fitting tube.

A12. A plug as set forth in claim A1 wherein the fitting tube comprises a head and the plug further comprises a fitting sized and shaped for reception on the head of the fitting tube.

A13. A plug as set forth in claim A12 wherein the fitting has a cavity constructed for creating an interference fit between the fitting and the head of the fitting tube when the fitting is received on the head of the fitting tube.

A14. A plug as set forth in claim A12 wherein the head of the fitting tube has a regular geometric shape and the cavity of the fitting has a regular geometric shape sized and shaped for engaging the head of the fitting tube for preventing rotation of the fitting with respect to the fitting tube when the fitting is on the fitting tube.

A15. A plug as set forth in claim A12 wherein the fitting includes an opening sized and shaped so the through hole of the fitting tube is accessible through the opening when the fitting is on the head of the fitting tube.

A16. A plug as set forth in claim A12 wherein the fitting comprises a generally oblong body including a grip, the body having opposite arcuate ends and opposite generally flat sides, the grip including side surfaces oriented for defining a cavity for receiving a portion of the fitting tube.

Kit Inclduing Three-Piece Plug and Ratchett Assembly

A17. A kit including a plug as set forth in claim A1 in combination with a ratchet assembly for use on a robot for installing the plug in the lateral line from the lateral opening in the main pipeline for temporarily plugging the lateral line, the ratchet assembly comprising:
 a ratchet including a bit constructed for engaging and rotating the wedge; and
 a grip constructed for preventing rotation of the fitting tube, the grip being positioned on the assembly with respect to the bit to permit the grip to prevent rotation of the fitting tube while the bit rotates the wedge.

A18. A kit as set forth in claim A17 wherein the wedge has a bore having a regular geometric shape and the bit has a corresponding regular geometric shape for engaging the bore of the wedge and rotating the wedge.

A19. A kit as set forth in claim A17 wherein the fitting tube has a head having a regular geometric shape and the grip is sized and shaped for gripping the head of the fitting tube.

20. A kit as set forth in claim A17 wherein the plug further comprises a fitting constructed for reception on the fitting tube and the grip is sized and shaped for gripping the fitting.

Method of Plugging Lateral Line Using Three-Piece Plug

A21. A method of temporarily plugging a lateral line from a lateral opening in a main pipeline, the method comprising:
 inserting a plug comprising a wedge in threaded engagement with a fitting tube in the lateral line from the lateral opening in the main pipeline; and
 rotating the wedge such that the threaded engagement of the wedge with the fitting tube causes axial movement of the wedge with respect to the fitting tube to tend to move the wedge toward a flow area of the main pipeline and cause the wedge to wedge a portion of the fitting tube outward to plug the lateral line.

A22. A method as set forth in claim A21 wherein the wedge includes a bore and rotating the wedge comprises engaging the bore with a tool from the main pipeline and rotating the wedge using the tool.

A23. A method as set forth in claim A21 wherein the portion of the fitting tube wedged outward deforms a gripping member around the fitting tube outward to plug the lateral line.

A24. A method as set forth in claim A21 further comprising gripping the fitting tube to hold it from rotation while rotating the wedge.

A25. A method as set forth in claim A24 wherein gripping the fitting tube comprises gripping a fitting on the fitting tube.

Method of Removing the Three-Piece Plug Using the Cutting and Brushing Assembly

A26. A method as set forth in claim A21 further comprising unplugging the lateral line from the lateral opening in the main pipeline by rotating conjointly a cutting bit and a brush, advancing the cutting bit into the plug to cut the plug with the cutting bit, and advancing the cutting bit further into the plug to engage the plug with the brush to loosen substantially all of the plug from the lateral line.

Four-Piece Plug

A27. A plug for temporarily plugging a lateral line from a lateral opening in a main pipeline, the plug having a distal end which in use is inserted in the lateral line and a proximal end which in use is positioned closer to a flow path in the main pipeline than the distal end, the plug comprising:
 a one piece fitting tube sized and shaped for being inserted at least partially in the lateral line, the fitting tube having a deformable portion and a through hole extending through the fitting tube from a proximal end of the fitting tube to a distal end of the fitting tube;
 a wedge sized and shaped to be at least partially receivable in the through hole of the fitting tube from the distal end of the fitting tube, the wedge having a bore extending from a proximal end of the wedge having an internal thread, the wedge including a head constructed for deforming the deformable portion of the fitting tube outward to plug the lateral opening, the head having a proximal portion having a lesser width than a distal portion of the head; and
 a bolt having a generally cylindrical shaft having an external thread on the shaft corresponding to the internal thread of the wedge for threadably engaging the wedge, the shaft being sized and shaped for being received at least partially in the through hole of the fitting tube from the proximal end of the fitting tube so the bolt is accessible from the main pipeline;
 whereby in use the bolt is positioned at least partially in the through hole of the fitting tube from the proximal end of the fitting tube and in threaded engagement with the wedge and rotation of the bolt causes axial movement of the wedge with respect to the fitting tube toward the flow path of the main pipeline and causes the head of the wedge to deform the deformable portion of the fitting tube outward to plug the lateral line.

A28. A plug as set forth in claim A27 wherein the head of the wedge has a frustoconical shape and flares outward from the proximal portion to the distal portion.

A29. A plug as set forth in claim A27 wherein the bolt includes a head on a proximal end of the shaft that is accessible from the main pipeline and has a shape to facilitate gripping by a tool for rotating the bolt by engaging the head with the tool.

A30. A plug as set forth in claim A29 wherein the head of the bolt has a regular geometric shape for engaging a tool having a corresponding regular geometric shape.

A31. A plug as set forth in claim A29 wherein the fitting tube comprises a head and a tubular insert portion, a distal end of the head being connected to a proximal end of the tubular insert portion.

A32. A plug as set forth in claim A31 wherein when the bolt is in threaded engagement with the wedge the head of the bolt engages the head of the fitting tube to prevent axial movement of the bolt with respect to the fitting tube away from the flow area of the main pipeline.

A33. A plug as set forth in claim A31 wherein the head of the fitting tube has a shape constructed to facilitate gripping by a tool for holding the head from rotation when the plug is inserted in the lateral line.

A34. A plug as set forth in claim A27 further comprising a gripping member sized and shaped for being inserted at least partially in the lateral line, the gripping member having an opening permitting the gripping member to be received around an outer surface of the fitting tube, whereby in use the gripping member is on the fitting tube and outward deformation of the deformable portion of the fitting tube causes the gripping member to deform outward to plug the lateral line.

A35. A plug as set forth in claim A34 wherein the opening of the gripping member has an internal diameter which is smaller than an outer diameter of the fitting tube to create an interference fit between the gripping member and the fitting tube.

A36. A plug as set forth in claim A27 wherein the fitting tube comprises a head and the plug further comprises a fitting sized and shaped for reception on the head of the fitting tube.

A37. A plug as set forth in claim A36 wherein the fitting has a cavity constructed for creating an interference fit between the fitting and the head of the fitting tube when the fitting is received on the head of the fitting tube.

A38. A plug as set forth in claim A36 wherein the head of the fitting tube has a regular geometric shape and the cavity of the fitting has a corresponding regular geometric shape for engaging the head of the fitting tube for preventing rotation of the fitting with respect to the fitting tube when the fitting is on the fitting tube.

A39. A plug as set forth in claim A36 wherein the fitting includes an opening sized and shaped so the bolt is accessible through the opening when the fitting is on the head of the fitting tube.

A40. A plug as set forth in claim A36 wherein the fitting comprises a generally oblong body including a grip, the body having opposite arcuate ends and opposite generally flat sides, the grip including side surfaces oriented for defining a cavity for receiving a portion of the fitting tube.

Kit Including Four-Piece Plug and Ratchet Assembly

A41. A kit including a plug as set forth in claim A27 in combination with a ratchet assembly for use on a robot for installing the plug in the lateral line from the lateral opening in the main pipeline for temporarily plugging the lateral line, the ratchet assembly comprising:
a ratchet including a socket constructed for engaging and rotating the bolt; and
a grip constructed for preventing rotation of the fitting tube, the grip being positioned on the assembly with respect to the socket to permit the grip to prevent rotation of the fitting tube while the socket rotates the bolt.

A42. A kit as set forth in claim A41 wherein the fitting tube has a head having a regular geometric shape and the grip is sized and shaped for gripping the head of the fitting tube.

A43. A kit as set forth in claim A41 wherein the plug further comprises a fitting constructed for reception on the fitting tube and the grip is sized and shaped for gripping the fitting.

Method of Plugging Lateral Line Using Four-Piece Plug

A44. A method of temporarily plugging a lateral line from a lateral opening in a main pipeline, the method comprising:
inserting a plug in the lateral line from the lateral opening in the main pipeline, the plug including a bolt at least partially received in a through-hole of a fitting tube and in threaded engagement with a wedge; and
rotating the bolt such that the threaded engagement of the bolt with the wedge causes axial movement of the wedge with respect to the fitting tube to tend to move the wedge toward a flow area of the main pipeline and cause the wedge to wedge a portion of the fitting tube outward to plug the lateral line.

A45. A method as set forth in claim A44 wherein the bolt includes a head and rotating the bolt comprises engaging the head of the bolt with a tool from the main pipeline and rotating the head using the tool.

A46. A method as set forth in claim A44 wherein the portion of the fitting tube wedged outward deforms a gripping member around the fitting tube outward to plug the lateral line.

A47. A method as set forth in claim A44 further comprising gripping the fitting tube to hold it from rotation while rotating the bolt.

A48. A method as set forth in claim A47 wherein gripping the fitting tube comprises gripping a fitting on the fitting tube.

Method of Removing the Four-Piece Plug Using the Cutting and Brushing Assembly

A49. A method as set forth in claim A44 further comprising unplugging the lateral line from the lateral opening in the main pipeline by rotating conjointly a cutting bit and a brush, advancing the cutting bit into the plug to cut the plug with the cutting bit, and advancing the cutting bit further into the plug to engage the plug with the brush to loosen substantially all of the plug from the lateral line.

Cutting and Brushing Assembly

A50. A cutting and brushing assembly configured for use with a robot for removing a plug plugging a lateral line from a lateral opening in a main pipeline, the plug having an outer diameter, the assembly comprising:
a mount for mounting the cutting and brushing assembly on the robot;
a cutting bit connected to the mount having a distal end which in use is advanced into the plug to cut the plug and having a proximal end and a width; and
a brush having a body connected to the cutting bit for conjoint rotation with the cutting bit, the body being spaced from the distal end of the cutting bit, the brush including bristles extending outward from the body, the brush having a width greater than the width of the cutting bit, and the brush being positioned between the mount and the distal end of the cutting bit.

A51. An assembly as set forth in claim A50 wherein distal ends of at least some of the bristles form a generally circular outer edge of the brush and the outer edge of the brush has a diameter greater than the width of the cutting bit.

A52. An assembly as set forth in claim A51 wherein the outer edge of the brush has a diameter about the same as the outer diameter of the plug.

Actuation Mechanism for Battery-Powered Ratchet Assembly

A53. A ratchet assembly for use on a robot for installing a plug in a lateral line from a lateral opening in a main pipeline for temporarily plugging the lateral line, the ratchet assembly comprising:
 a ratchet having a motor for rotating a part of the plug, a battery operatively connected to the motor for energizing the motor, and a trigger adapted for controlling operation of the motor, the trigger having a first position in which the motor is energized and a second position in which the motor is not energized; and
 an actuation mechanism connected to the ratchet including a piston and an actuator connected to the piston, the actuator being selectively movable by the piston to engage the trigger and move the trigger to the first position to energize the motor.

What is claimed is:

1. A plug for temporarily plugging a lateral line from a lateral opening in a main pipeline, the plug having a distal end which in use is inserted in the lateral line and a proximal end which in use is positioned closer to a flow path in the main pipeline than the distal end, the plug comprising:
 a one piece fitting tube having a proximal end and a distal end, the fitting tube being sized and shaped for being inserted distal end first at least partially in the lateral line, the fitting tube having a deformable portion and a through hole extending through the fitting tube from a proximal end of the fitting tube to a distal end of the fitting tube, the fitting tube having a thread on an inner surface of the through hole; and
 a wedge sized and shaped to be at least partially receivable in the through hole of the fitting tube from the distal end of the fitting tube, the wedge having an external thread corresponding to the thread on the inner surface of the through hole of the fitting tube for threadably engaging the fitting tube, the wedge including a head constructed for deforming the deformable portion of the fitting tube outward to plug the lateral opening, the head having a proximal portion having a lesser width than a distal portion of the head; and
 whereby in use the wedge is inserted in and in threaded engagement with the through hole of the fitting tube from the distal end of the fitting tube and rotation of the wedge causes axial movement of the wedge with respect to the fitting tube toward the flow path of the main pipeline and causes the head of the wedge to deform the deformable portion of the fitting tube outward to plug the lateral line.

2. A plug as set forth in claim 1 wherein the head of the wedge has a frustoconical shape and flares outward from the proximal portion to the distal portion.

3. A plug as set forth in claim 1 wherein the wedge has a bore accessible through the through hole of the fitting tube from the proximal end of the plug, the bore being sized and shaped to receive a tool for rotating the wedge by engaging the bore with the tool.

4. A plug as set forth in claim 1 wherein the wedge further comprises a generally cylindrical shaft having a distal end connected to the head of the wedge and the external thread is on an outer surface of the shaft.

5. A plug as set forth in claim 1 wherein the fitting tube comprises a head and a tubular insert portion, a distal end of the head being connected to a proximal end of the tubular insert portion.

6. A plug as set forth in claim 1 further comprising a gripping member sized and shaped for being inserted at least partially in the lateral line, the gripping member having an opening permitting the gripping member to be received around an outer surface of the fitting tube, whereby in use the gripping member is on the outer surface of the fitting tube and outward deformation of the deformable portion of the fitting tube causes the gripping member to deform outward to plug the lateral line.

7. A plug as set forth in claim 1 wherein the fitting tube comprises a head and the plug further comprises a fitting sized and shaped for reception on the head of the fitting tube.

8. A method of temporarily plugging a lateral line from a lateral opening in a main pipeline, the method comprising:
 inserting a plug comprising a wedge in threaded engagement with a fitting tube in the lateral line from the lateral opening in the main pipeline; and
 rotating the wedge such that the threaded engagement of the wedge with the fitting tube causes axial movement of the wedge with respect to the fitting tube to tend to move the wedge toward a flow area of the main pipeline and cause the wedge to wedge a portion of the fitting tube outward to plug the lateral line.

9. A method as set forth in claim 8 wherein the wedge includes a bore and rotating the wedge comprises engaging the bore with a tool from the main pipeline and rotating the wedge using the tool.

10. A method as set forth in claim 8 wherein the portion of the fitting tube wedged outward deforms a gripping member around the fitting tube outward to plug the lateral line.

11. A method as set forth in claim 8 further comprising gripping the fitting tube to hold it from rotation while rotating the wedge.

12. A method as set forth in claim 8 further comprising unplugging the lateral line from the lateral opening in the main pipeline by rotating conjointly a cutting bit and a brush, advancing the cutting bit into the plug to cut the plug with the cutting bit, and advancing the cutting bit farther into the plug to engage the plug with the brush to loosen substantially all of the plug from the lateral line.

13. A plug for temporarily plugging a lateral line from a lateral opening in a main pipeline, the plug having a distal end which in use is inserted in the lateral line and a proximal end which in use is positioned closer to a flow path in the main pipeline than the distal end, the plug comprising:
 a one piece fitting tube sized and shaped for being inserted at least partially in the lateral line, the fitting tube having a deformable portion and a through hole extending through the fitting tube from a proximal end of the fitting tube to a distal end of the fitting tube;
 a wedge sized and shaped to be at least partially receivable in the through hole of the fitting tube from the distal end of the fitting tube, the wedge having a bore extending from a proximal end of the wedge having an internal thread, the wedge including a head constructed for deforming the deformable portion of the fitting tube outward to plug the lateral opening, the head having a proximal portion having a lesser width than a distal portion of the head; and
 a bolt having a generally cylindrical shaft having an external thread on the shaft corresponding to the internal thread of the wedge for threadably engaging the wedge, the shaft being sized and shaped for being received at least partially in the through hole of the fitting tube from the proximal end of the fitting tube so the bolt is accessible from the main pipeline;

whereby in use the bolt is positioned at least partially in the through hole of the fitting tube from the proximal end of the fitting tube and in threaded engagement with the wedge and rotation of the bolt causes axial movement of the wedge with respect to the fitting tube toward the flow path of the main pipeline and causes the head of the wedge to deform the deformable portion of the fitting tube outward to plug the lateral line.

14. A method of temporarily plugging a lateral line from a lateral opening in a main pipeline, the method comprising:

inserting a plug in the lateral line from the lateral opening in the main pipeline, the plug including a bolt at least partially received in a through-hole of a fitting tube and in threaded engagement with a wedge; and rotating the bolt such that the threaded engagement of the bolt with the wedge causes axial movement of the wedge with respect to the fitting tube to tend to move the wedge toward a flow area of the main pipeline and cause the wedge to wedge a portion of the fitting tube outward to plug the lateral line.

15. A method as set forth in claim 14 wherein the bolt includes a head and rotating the bolt comprises engaging the head of the bolt with a tool from the main pipeline and rotating the head using the tool.

16. A method as set forth in claim 14 wherein the portion of the fitting tube wedged outward deforms a gripping member around the fitting tube outward to plug the lateral line.

17. A method as set forth in claim 14 further comprising gripping the fitting tube to hold it from rotation while rotating the bolt.

18. A method as set forth in claim 14 further comprising unplugging the lateral line from the lateral opening in the main pipeline by rotating conjointly a cutting bit and a brush, advancing the cutting bit into the plug to cut the plug with the cutting bit, and advancing the cutting bit farther into the plug to engage the plug with the brush to loosen substantially all of the plug from the lateral line.

* * * * *